(12) United States Patent
Cullinane et al.

(10) Patent No.: US 10,816,983 B2
(45) Date of Patent: *Oct. 27, 2020

(54) SELECTING A DRIVING TRAJECTORY FOR A VEHICLE OPERATING IN AN AUTONOMOUS MODE

(71) Applicant: Waymo LLC, Mountain View, CA (US)

(72) Inventors: Brian Cullinane, San Jose, CA (US); Nicholas Kenneth Hobbs, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 266 days.

This patent is subject to a terminal disclaimer.

(21) Appl. No.: 15/939,559

(22) Filed: Mar. 29, 2018

(65) Prior Publication Data

US 2018/0364723 A1 Dec. 20, 2018

Related U.S. Application Data

(63) Continuation of application No. 14/788,901, filed on Jul. 1, 2015, now Pat. No. 9,950,708, which is a (Continued)

(51) Int. Cl.
*G05D 1/02* (2020.01)
*B60W 30/095* (2012.01)
(Continued)

(52) U.S. Cl.
CPC ......... *G05D 1/0214* (2013.01); *B60W 30/085* (2013.01); *B60W 30/09* (2013.01); *B60W 30/095* (2013.01); *B60W 30/0956* (2013.01); *G06K 9/00791* (2013.01); *G06K 9/00832* (2013.01); *B60W 2540/00* (2013.01);
(Continued)

(58) Field of Classification Search
CPC ............ G05D 1/0214; G06K 9/00791; G06K 9/00832; B60W 30/085; B60W 30/09; B60W 30/095; B60W 30/0956
See application file for complete search history.

(56) References Cited

U.S. PATENT DOCUMENTS 8,095,313 B1 * 1/2012 Blackburn ............. G08G 1/166
180/271
8,520,695 B1 * 8/2013 Rubin .................... G01C 21/26
370/445

(Continued)

*Primary Examiner* — Behrang Badii
*Assistant Examiner* — Daniel L Greene
(74) *Attorney, Agent, or Firm* — Mcdonnell Boehnen Hulbert & Berghoff LLP

(57) ABSTRACT

Methods and apparatus are disclosed for customizing driving operations of a vehicle based on occupant(s) of the vehicle. An autonomous vehicle that includes a passenger compartment can determine a presence of an occupant of the passenger compartment. The autonomous vehicle can determine a location of the occupant within the passenger compartment. Additional information about the occupant can be determined. A driving operation can be selected from among a plurality of driving operations based on the location and additional information about the occupant. The selected driving operation can be performed, perhaps by the autonomous vehicle.

20 Claims, 10 Drawing Sheets

Related U.S. Application Data continuation of application No. 13/668,194, filed on Nov. 2, 2012, now abandoned.

(51) Int. Cl.
  *G06K 9/00* (2006.01)
  *B60W 30/085* (2012.01)
  *B60W 30/09* (2012.01)
  *G01S 13/931* (2020.01)
  *G05D 1/00* (2006.01)

(52) U.S. Cl.
  CPC .............. *G01S 2013/9318* (2020.01); *G01S 2013/9319* (2020.01); *G01S 2013/93185* (2020.01); *G05D 1/0088* (2013.01); *G05D 2201/0212* (2013.01)

(56) References Cited

U.S. PATENT DOCUMENTS

| | | | |
|---|---|---|---|
| 2005/0278098 A1* | 12/2005 | Breed | B60K 35/00 701/45 |
| 2007/0080825 A1* | 4/2007 | Shiller | B62D 15/029 340/903 |
| 2008/0040004 A1* | 2/2008 | Breed | G01S 13/931 701/45 |
| 2008/0296429 A1* | 12/2008 | Edelson | B64F 1/22 244/50 |
| 2010/0253540 A1* | 10/2010 | Seder | G01S 13/931 340/905 |
| 2010/0253541 A1* | 10/2010 | Seder | G01S 13/931 340/905 |
| 2014/0136414 A1* | 5/2014 | Abhyanker | G06Q 50/28 705/44 |
| 2016/0357188 A1* | 12/2016 | Ansari | G05D 1/0212 |

\* cited by examiner

SELECTING A DRIVING TRAJECTORY FOR A VEHICLE OPERATING IN AN AUTONOMOUS MODE

CROSS REFERENCE TO RELATED APPLICATIONS

The present application is a continuation of U.S. patent application Ser. No. 14/788,901, filed on Jul. 1, 2015 and issued as U.S. Pat. No. 9,950,708, which is a continuation of U.S. patent application Ser. No. 13/668,194, filed on Nov. 2, 2012, the entire contents of all of which are herein incorporated by reference as if fully set forth in this description.

BACKGROUND

Unless otherwise indicated herein, the materials described in this section are not prior art to the claims in this application and are not admitted to be prior art by inclusion in this section.

Some vehicles are configured to operate in an autonomous mode in which the vehicle navigates through an environment with little or no input from a driver. Such a vehicle typically includes one or more sensors that are configured to sense information about the environment. The vehicle can use the sensed information to navigate through the environment. For example, if the sensors sense that the vehicle is approaching an obstacle, the vehicle can navigate around the obstacle.

The vehicle typically has a compartment for passengers riding in the vehicle. The passenger compartment is generally configured to hold two or more passengers. In most cases, the passengers include a driver who often can manually control the direction, speed, and acceleration of the vehicle. The driver typically rides in a front seat of the vehicle compartment, while passengers typically ride in the other seats of the vehicle compartment.

SUMMARY

In a first aspect, a method is provided. An autonomous vehicle having a passenger compartment determines a presence of an occupant of the passenger compartment. A location of the occupant within the passenger compartment is determined using the autonomous vehicle. Additional information about the occupant is determined. A driving operation is selected from among a plurality of driving operations based on the location and additional information about the occupant. The selected driving operation is performed.

In another aspect, an article of manufacture including a non-transitory computer-readable storage medium having program instructions stored thereon is provided. The program instructions, upon execution by a computer system, cause the computer system to perform operations. The operations include: (a) determining a presence of an occupant of a passenger compartment, (b) determining a location of the occupant within the passenger compartment, (c) determining additional information about the occupant, (d) selecting a driving operation from among a plurality of driving operations based on the location and additional information about the occupant, and (e) performing the selected driving operation.

In yet another aspect, an autonomous vehicle is provided. The autonomous vehicle includes a passenger compartment, a processor, and a computer-readable storage medium. The non-transitory computer-readable storage medium stores instructions that, when executed by the processor, cause the autonomous vehicle to perform operations. The operations include: (a) determining a presence of an occupant of the passenger compartment, (b) determining a location of the occupant within the passenger compartment, (c) determining additional information about the occupant, (d) selecting a driving operation from among a plurality of driving operations based on the location and additional information about the occupant, and (e) performing the selected driving operation.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Overview

Figure 1:
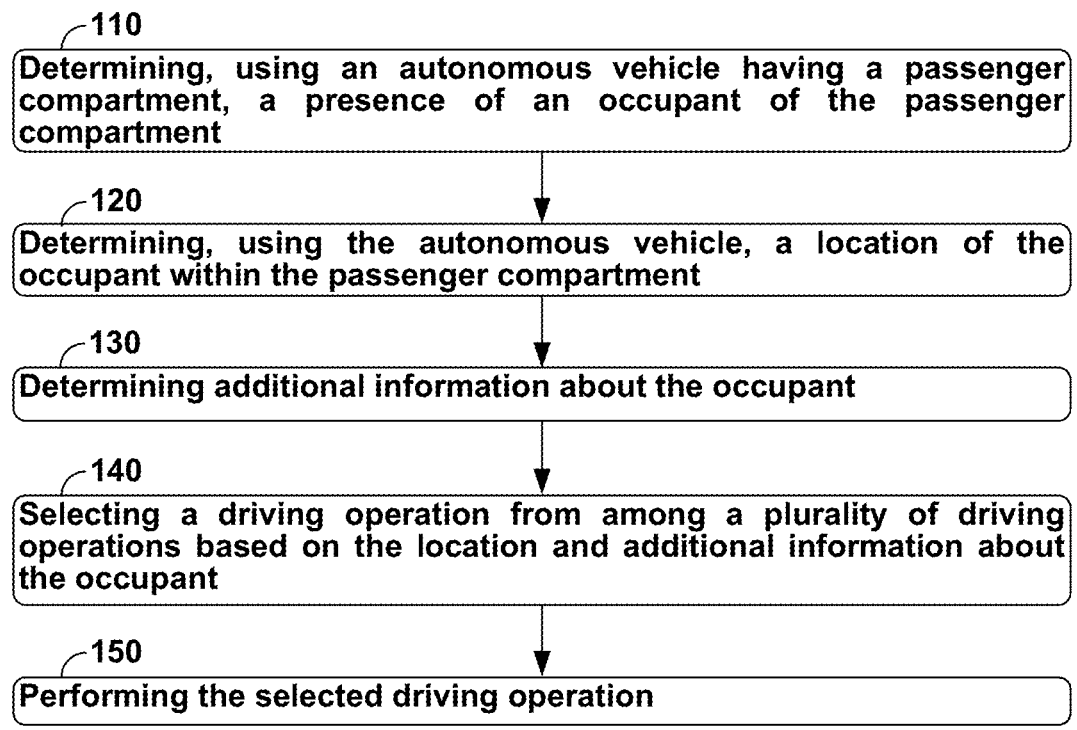
FIG. 1 is a flow chart of a method, according to an example embodiment.

Example embodiments disclosed herein relate to methods and apparatus that consider information about vehicle occupant(s) when selecting and performing driving behaviors. Information about vehicle occupant(s) can include but is not limited to position of occupant(s) within the vehicle, ages of occupants, sizes/weights of the occupant(s), identities of occupant(s), and preferences of occupant(s). Vehicle occupant information can be determined using sensors, direct input from occupants, information gathered from sources outside of the vehicle, and other sources.

The driving behaviors can be selected and performed by an autonomous vehicle. The autonomous vehicle can include a computer system programmed to function as a vehicle control system that generates, selects and/or performs driving behaviors. In some embodiments, the driving behaviors can be based on occupant(s) of the vehicle. Example driving behaviors include one or a combination of: maintaining an average road driving speed, changing speeds, selecting and traversing routes, turning/traversing performance at an intersection, passing behaviors including maintaining average passing distance, turning left/right, bearing left/right, reversing direction, performing a U-turn, increasing speed, decreasing speed, slowly moving forward, and stopping. Other driving behaviors are possible as well.

The vehicle control system can be a component of or take the form of a vehicle, such as an automobile. Alternatively, the vehicle control system may be implemented in or take the form of another vehicle, such as a truck, motorcycle, off-road vehicle, bus, boat, airplane, helicopter, lawn mower, recreational vehicle, amusement park vehicle, farm vehicle, construction vehicle, tram, golf cart, train, or trolley. Other vehicles can possibly be controlled by vehicle control systems as well.

The autonomous vehicle can operate in an operational mode, such as a non-autonomous mode, a partially-autonomous mode, or an autonomous-operation mode. The non-autonomous mode can use human input to select and execute driving behaviors during operation of the vehicle. The partially-autonomous mode involves both vehicle control system and human inputs to select driving behaviors during operation of the vehicle. For example, the vehicle control system can generate indications of driving behaviors for review by a human driver. For each indication, the human driver can review the indication and operate the vehicle by carrying out, modifying, or ignoring the indication. In some cases, the partially-autonomous mode can involve the autonomous vehicle performing all actions required to navigate and drive the vehicle, where a human driver can monitor the autonomous vehicle's performance and intervene if and when necessary; e.g., to avert an accident. Additional techniques for operating a vehicle in a partially-autonomous mode, such as auto-piloting and automatic parking, are possible as well.

In the autonomous-operation mode, the vehicle control system can select and execute driving behaviors along at least part of the route without human input. The autonomous-operation mode can be sub-divided into an autonomous mode utilizing a trained driver, an autonomous mode with a non-trained human driver, and an autonomous mode without a human driver. In autonomous-mode operation with a human driver, the vehicle control system can be configured to receive feedback from the human passenger about driving quality of the autonomous vehicle, and, in some circumstances, for the human driver to operate the vehicle.

To learn a position of an occupant within a vehicle, one or more sensors can be used. For example, seat weight sensors and/or occupant classification systems can detect the presence of occupants. In some embodiments, a combination of pressure and heat sensors can be used to detect the presence of weight and emission of heat characteristic of a living occupant. Based on the data from the seat weight sensors and/or occupant classification systems, an age classification and position of the occupant can be determined. For example, an occupant weighing 40 pounds can be classified as a lower-weight individual; while an occupant weighing 200 pounds can be classified as a higher-weight individual. This data can also report the locations of the occupants within the vehicle (driver's side, passenger's side, front, middle, back, etc.).

In some scenarios, additional sensors can add information about age classifications. For example, an anchor hook for attaching a special safety seat can be configured with a sensor that detects whether or not a safety seat is connected to the anchor hook. When a possible occupant is detected in a seat of a vehicle that may either be a younger or older individual, the autonomous vehicle can test the anchor-hook sensor to see if a safety seat is attached. If the anchor-hook sensor indicates a safety seat is attached, then the age classification can be adjusted to indicate that a younger person is in the seat of the vehicle. On the other hand, if the anchor-hook sensor indicates a safety seat is not attached, then the age classification can be adjusted to indicate that an older person is in the seat of the vehicle.

An identity of an occupant can be determined. In some embodiments, the vehicle control system can have a voice interface that can capture, compare, and store information about voice(s) of occupant(s). Occupants can then be identified based on the stored voice information. In other embodiments, occupants can provide identifying information textually; e.g., via use of a touch screen, touch pad, keypad, or other interface that permits an occupant to enter text. The entered text can include identifying information that can be captured, stored, and compared to determine an identity of an occupant. In still other embodiments, a camera or similar device can capture image(s) of occupants that can be stored and compared to identify occupants, such as by use of facial recognition techniques. In even other embodiments, information from multiple devices can be reviewed to determine occupant(s) of the vehicle; for example, location and/or velocity information of a device, such as a mobile phone, associated with a passenger can be compared to location and/or velocity information for the autonomous vehicle. If the device's location and/or velocity information (approximately) matches the location and/or velocity information from the autonomous vehicle, then the passenger associated with the device can be determined to be located within the autonomous vehicle. Combinations of these techniques and/or other techniques to identify occupants, e.g., biometric techniques, can be used as well or instead.

A profile can store information about one or more occupants. The occupant's profile can be initialized from a default profile that contains information about a generic occupant of the vehicle. An example profile is shown in Table 1:

TABLE 1

| Driving Behavior | Occupant Configuration | Behavior Setting |
| --- | --- | --- |
| Turn left through intersection | Driver's seat only | Protect driver |
| Turn left through intersection | Driver's seat + front passenger seat | Protect front end |
| Turn left through intersection | Driver seat + rear driver's side seat | Protect driver's side |
| Straight ahead through intersection | All | Creep through crosswalk and gradually increase speed after |
| Following behavior | All | Use two-second rule |
| Passing behavior | Driver's seat only | Safe passing |
| Passing behavior | Driver seat + rear driver's side passenger seat | Safe passing |
| Maximum Speed | All | 80 |

In some embodiments, the profile of Table 1 can act as a default profile.

Once a profile is generated for an occupant, the occupant can perform operations on the profile; e.g., review the profile, change behavior settings, save the profile, restore the profile to default profile settings, delete the profile, etc. In other embodiments, more, less, and/or different information than shown in Table 1 can be part of a default and/or occupant profile. For example, a profile can contain additional information to that shown in Table 1, such as, but not limited to, occupant identification information, additional driving behaviors, behavior settings, and/or occupant configurations, routing information, and location information.

The use of information about occupants in vehicles can lead to more customized behavior by autonomous and non-autonomous vehicles. The customized behavior can include selection of safer, more efficient driving behaviors that also provide additional satisfaction to the occupants. Also, as the behaviors are customizable, perhaps by use of occupant-specific profiles, an occupant can make selections that cause the vehicle to act in increased harmony with the desired vehicular behaviors of the occupant. In some cases, adoption and use of autonomous vehicles can be accelerated by increasing the flexibility of the autonomous vehicles by giving occupants additional choices and control.

Example Operations

FIG. 1 is a flow chart of method 100, according to an example embodiment. Method 100 begins at block 110, where an autonomous vehicle having a passenger compartment can determine a presence of an occupant of the passenger compartment. For example, seat weight sensors, pressure sensors, heat sensors, and/or occupant classification systems can be used as discussed above to determine the presence of occupant(s) of the passenger compartment.

Other sensors and techniques, such as the use of cameras, microphones, commands, etc. can be used as well or instead to determine that occupant(s) are present within the passenger compartment. For example, the autonomous vehicle can detect a device outside of the vehicle that can be associated with a passenger; e.g., a mobile phone. Based on the position and velocity of the device, the autonomous vehicle can determine that the passenger is approaching the autonomous vehicle. As the passenger approaches, the autonomous vehicle can determine biometric information about the approaching passenger, such as height information, by processing images from cameras capturing images of the approaching passenger, using lasers configured to determined heights of nearby objects, etc. Also, as passengers enter the autonomous vehicle, the autonomous vehicle can learn and recall which door each passenger used for entry, and therefore determine one or more likely seats that the passenger is occupying based on which seat(s) are closest to the entry door. Other examples are possible as well.

At block 120, the autonomous vehicle can determine a location of the occupant within the passenger compartment. For example, suppose that the passenger compartment contains N passenger seats, N>1, with each passenger seat at a fixed location within the passenger compartment; e.g., a driver's seat, a front passenger's seat, one or more back passenger seats, etc. Let each of the N seats be configured with one or more of the sensors and/or occupant classification systems discussed above in the context of block 110. Then, a location for a passenger can be determined by: (a) obtaining data from the sensor(s) and/or occupant classification system(s) for a particular seat of the N seats that an occupant is present in the particular seat and (b) determining the fixed location of the particular seat. Other techniques are possible as well; e.g., the sensor data can include location data, sensor identifiers can encode or otherwise specify location information, commands such as "Rick is in the driver's seat" can include location information, and so on.

At block 130, additional information about the occupant can be determined. In some embodiments, the additional information can include information about an age of the occupant.

At block 140, a driving operation can be selected from among a plurality of driving operations based on the location and additional information about the occupant. In some embodiments, selecting the driving operation can include: determining that an occupant is in a driver's seat of the autonomous vehicle and in response to determining that the occupant is in the driver's seat, selecting a driving operation that enhances safety of the occupant in the driver's seat.

In particular embodiments, selecting the driving operation that enhances safety of the occupant in the driver's seat can include: determining that a left turn at an intersection is to be performed and selecting a path for the left turn through the intersection that enhances safety of the occupant in the driver's seat, where the path for the left turn includes a wider path for the left turn. In other particular embodiments, selecting the driving operation that enhances safety of the occupant in the driver's seat can include: determining that a right turn at an intersection is to be performed and selecting a path for the right turn through the intersection that enhances safety of the occupant in the driver's seat, where the path for the right turn includes a sharper path for the right turn.

In other embodiments, selecting the driving operation can include: when two or more occupants are in a vehicle, selecting a driving operation that enhances safety of a particular position (e.g., of an occupant in a second of two positions). In particular of the other embodiments, selecting the driving operation that enhances safety of the occupant in the second position can include: determining that a left turn at an intersection is to be performed and selecting a sharper path for the left turn through the intersection. In yet other particular of the other embodiments, selecting the driving operation that enhances safety of the occupant in the second position can include: determining that a right turn at an intersection is to be performed and selecting a wider path for the left turn through the intersection.

In other embodiments, the additional information about the occupant can include a profile about the occupant. The profile can include information about driving behaviors, occupant configurations, and behavior settings. In these embodiments, selecting the driving operation from among the plurality of driving operations can include selecting the driving operation based on a behavior setting in the profile about the occupant for a driving behavior related to the driving operation.

At block 150, the selected driving operation can be performed. In some embodiments, method 100 can include receiving a first command from the occupant. The first command can include information about a first desired driving behavior. A second command can be received from the occupant, where the second command can include information about a second desired driving behavior. A determination can be made that the first and second desired driving behaviors are related. In response to determining that the first and second driving behaviors are related, changing the information in the profile based on the first and second commands.

For example, suppose an occupant provides a command such as "slow down". In response, the autonomous vehicle decreases speed for a period of time. After the period of time, the autonomous vehicle increases speed and, in response, the occupant provides a second command of "slow down." In response to the second command, the autonomous vehicle can both slow down and update a profile associated with the occupant to change a "maximum speed" and/or other parameter(s) based on the second "slow down" command and, perhaps the maximum speed reached before receiving either "slow down" command. Many other examples are possible as well.

Example Scenarios for Occupant Specific Vehicle Operation

Figure 2A:
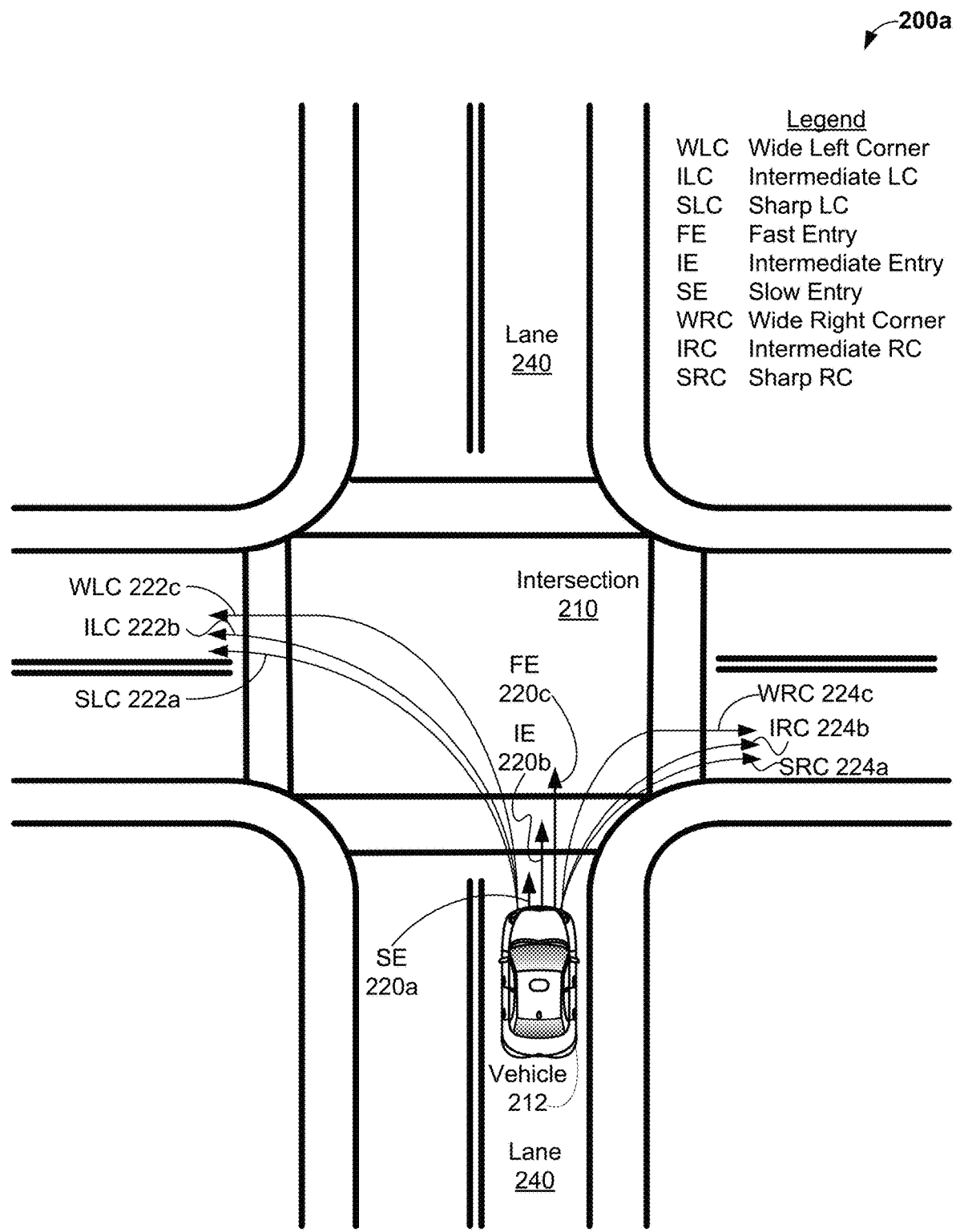
FIG. 2A shows an example scenario of a vehicle traversing an intersection, in accordance with an example embodiment.

FIG. 2A shows example scenario 200a of vehicle 212 traversing intersection 210, in accordance with an example embodiment. Vehicle 212 can traverse intersection 210 by taking a left corner (LC), driving straight through, or by taking a right corner (RC), perhaps based on a route vehicle 212 is taking to a destination. Each of these driving behaviors has a range of possible choices in performance.

Vehicle 212 can be configured to perform analyses to determine a potential harm to each a passenger during driving scenarios, such as making a left turn at intersection 210 using a specified route through the intersection. Vehicle 212 can determine outcome(s) that lead to the lowest overall potential harm, where the outcomes are based on vehicle 212's behavior during the driving scenarios. Then, vehicle 212 can select behavior(s) to actuate the lowest overall potential harm.

The behavior(s) can be selected based on minimizing harm and/or using information from the passenger(s), such as preferences stored in profile for the passenger(s). For example, suppose that autonomous vehicle 212 traversing intersection 210 has a passenger in the driver's seat and a passenger in the back seat. Vehicle 212 can traverse intersection 210 using multiple choices of paths through the intersection, and that each path choice had approximately the same potential harm. Further suppose that profile information indicated that a driver in vehicle 212 had a selection to minimize harm to any passenger(s) in the back seat and, if possible, to then minimize harm to the driver. Based on this information, vehicle 212 can select paths that minimize potential harm to the passenger in the rear seat.

FIG. 2A shows three possible choices for traversing intersection 210 by driving straight through: a slow entry (SE) 220a, an intermediate entry (IE) 220b, and a fast entry (FE) 220c. Slow entry 220a can be performed by waiting before entering intersection 210 and/or by choosing a relatively small amount of acceleration/speed upon deciding to enter intersection 210. Similarly, intermediate entry 220b and fast entry 220b can be performed, in comparison to slow entry 220a, by waiting respectively less (or no) time before entering intersection and/or by choosing respectively larger amounts of acceleration/speed upon deciding to enter intersection 210. Other possible choices for traversing intersection 210 straight through not shown in FIG. 2A can include, but are not limited to: "stuttering" or slowing down and then speeding up through intersection 210, waiting for vehicles ahead of and/or traveling in other directions than vehicle 212 before entering intersection 210, moving from side-to-side within lane 240, changing lanes before or after traversing intersection 210, and using variable speeds to traverse intersection 210. Other driving behaviors for driving straight through intersection 210 are possible as well.

FIG. 2A shows three example possible choices for performing a driving behavior of taking a left corner: a sharp left corner (SLC) 222a, an intermediate left corner (ILC) 222b, and a wide left corner (WLC) 222c. Additionally, FIG. 2A shows three example possible choices for performing a driving behavior of taking a right corner: a sharp right corner (SRC) 224a, an intermediate right corner (IRC) 224b, and a wide right corner (WRC) 224c. Other possible choices can include, but are not limited to, taking paths for the left/right corner between sharp left/right corner 222a/224a and wide left/right corner 222c/224c not shown in FIG. 2A, taking a path for the left/right corner that is sharper; i.e., closer to the nearest street corner than sharp left/right corner 222a/224a, and taking a path that is wider; i.e., closer to the further street corner than wide left/right corner 222c/224c.

Other driving behaviors related to taking a corner can include selecting an amount of time, including no time, to wait before taking the corner, selecting different speeds/accelerations while taking the corner, moving slightly side-to-side on a path for taking the corner, stuttering before or perhaps while taking the corner, waiting for other vehicles, changing lanes before, during, or after taking the corner; e.g., turning from a turn lane into a non-turn lane, and using variable speeds to traverse intersection 210. Other driving behaviors for taking left and right corners through intersection 210 are possible as well.

Figure 2B:
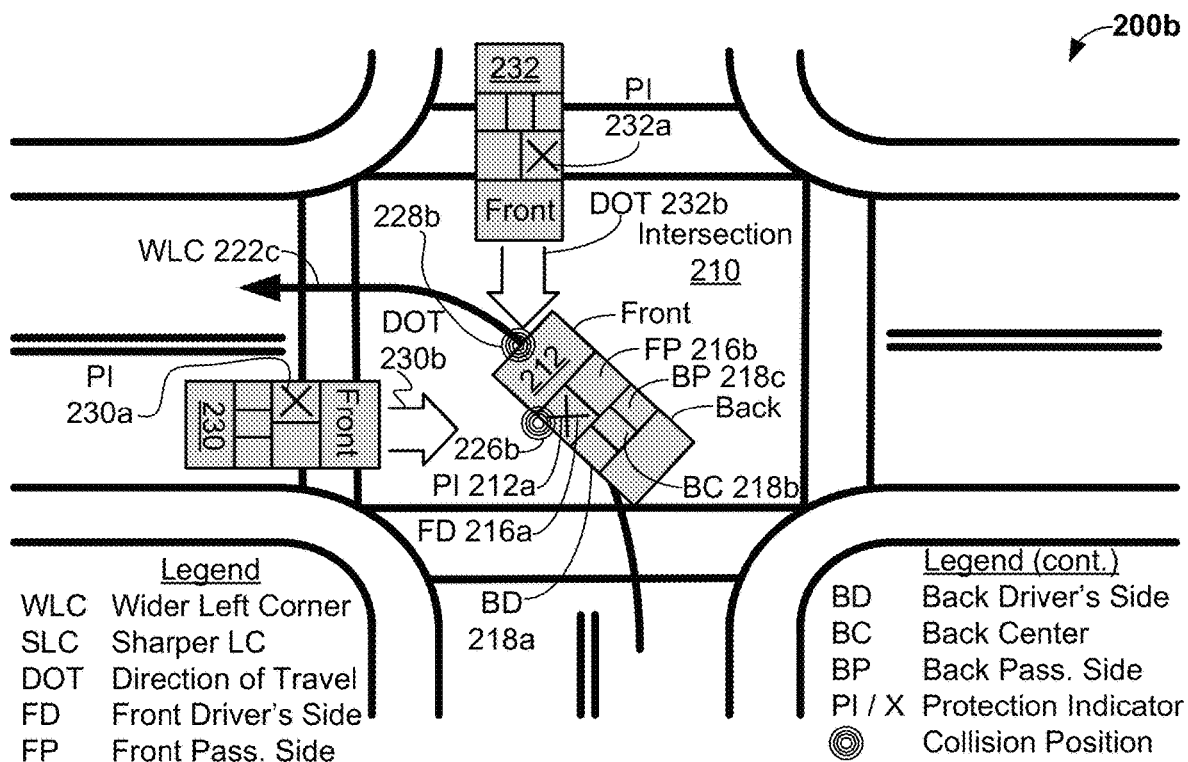
FIG. 2B shows an example scenario where the vehicle traverses the intersection via a left turn, in accordance with an example embodiment.

FIG. 2B shows scenario 200b where vehicle 212 traverses intersection 210 via a left turn, in accordance with an example embodiment. FIG. 2B represents autonomous vehicle 212 as a group of rectangles, with a front rectangle corresponding to a front compartment; e.g., engine, battery, and/or storage compartment, and a back rectangle corresponding to a back compartment; e.g., another engine, battery, and/or storage compartment. Between the front compartment and the back compartment lies a passenger compartment. Also, FIG. 2B represents the passenger compartment of vehicle 212 with five rectangles representing possible occupant positions: rectangle FD 216a for a front driver's side occupant position, rectangle FP 216b for a front passenger's side occupant position, rectangle BD 218a for a back driver's side occupant position, rectangle BC 218b for a back central occupant position, and rectangle BP 216c for a back passenger's side occupant position. In other embodiments, the passenger compartment of vehicle 212 can have more or fewer possible occupant positions.

FIG. 2B also shows protection indicator (PI) 212a of an "X" to indicate an occupant position of an occupant to be protected during scenario 200b. FIG. 2B shows protection indicator 212a in position FD 216a to indicate that the front driver's side occupant position is to be protected by vehicle 212 during scenario 200b. Vehicle 212 can protect occupant position FD 216a by selecting driving behaviors that minimize risk to and/or maximize protection of occupant position FD 216a. For example, a driver's side or front side collision is likely more dangerous to the safety and well-being of an occupant in occupant position FD 216a than a passenger's side or back side collision. An example driver's side collision could occur if vehicle 230 traveling along direction of travel 230b were to collide with vehicle 212 close to or at collision position 226a indicated in FIG. 2B. As shown in FIG. 2B, an example front side collision could occur if vehicle 232 travels along direction of travel 232b to collide with front of vehicle 230 close to or at collision position 228b.

Also, while vehicle 232 traverses the intersection in direction of travel 232b, vehicle 232 could collide with vehicle 212. If vehicle 212 arrives in the intersection after vehicle 232 traverses the intersection, a collision can be avoided. However if a collision occurs, an occupant in occupant position FD 216a can be better protected if collision positions 226b and/or 226b are on the passenger's side and/or at the back of vehicle 212.

When turning left at an intersection, the autonomous vehicle can take wide left turn 222c to potentially avoid a driver's side collision by giving a colliding vehicle; e.g., vehicles 230, 232 more time either to slow down before the collision or traverse the intersection to avoid the collision. Also, by taking the wider left turn, additional protection for the occupant in occupant position FD 216a can be provided in event of a collision as discussed above. Vehicle 212 can select a driving behavior including wide left turn 222c perhaps in response to a "protect driver's seat" (or similar) behavior setting for a "turn left through intersection" (or similar) driving behavior in a profile for the occupant in FD 216a.

Figure 2C:
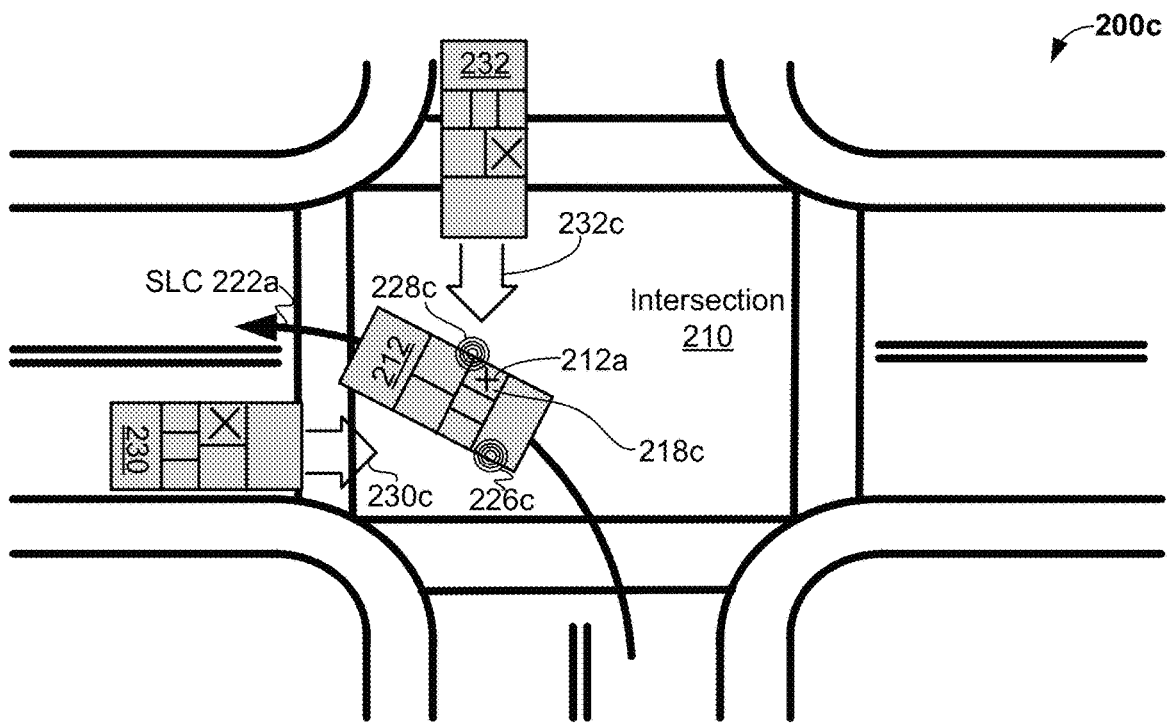
FIG. 2C shows an example scenario where the vehicle traverses the intersection via another left turn, in accordance with an example embodiment.

FIG. 2C shows scenario 200c where vehicle 212 traverses intersection 210 via a left turn, in accordance with an example embodiment. FIG. 2C shows protection indicator 212a of an "X" to indicate an occupant position of an occupant to be protected during scenario 200b. FIG. 2C shows protection indicator 212a in position BP 218c to indicate that the back passenger's side occupant position is to be protected by vehicle 212. Vehicle 212 can protect occupant position BP 218c by selecting driving behaviors that minimize risk to and/or maximize protection of occupant position BP 218c. For example, a passenger's side or back side collision is likely more dangerous to the safety and well-being of an occupant in occupant position BP 218c than a driver's side or front side collision. An example back side collision could occur if vehicle 230 traveling along direction of travel 230c were to collide with vehicle 212 at or near collision position 226c. As shown in FIG. 2B, an example right side collision could occur if vehicle 232 travels along direction of travel 232c to collide with front of vehicle 230 close to or at collision position 228c.

Also, while vehicle 232 traverses the intersection in direction of travel 232c, vehicle 232 could collide with vehicle 212. If vehicle 212 arrives in the intersection before vehicle(s) 230 and/or 232 attempt to traverse the intersection, collisions can be avoided. However if a collision occurs, an occupant in occupant position BP 218a can be better protected if collision position 226c and/or 228c are on the front side or the driver's side of vehicle 212.

When turning left at an intersection, the autonomous vehicle can take sharp left turn 222a to potentially avoid a passenger side collision by giving a colliding vehicle; e.g., vehicles 230, 232 less time to traverse the intersection to avoid the collision. Also, by taking the sharper left turn, additional protection for the occupant in occupant position BP 218c can be provided in event of a collision as discussed above. Vehicle 212 can select a driving behavior including sharp left turn 222c perhaps in response to a "protect back passenger's seat" (or similar) behavior setting for a "turn left through intersection" (or similar) driving behavior in a profile for the occupant in BP 218c.

Figure 2D:
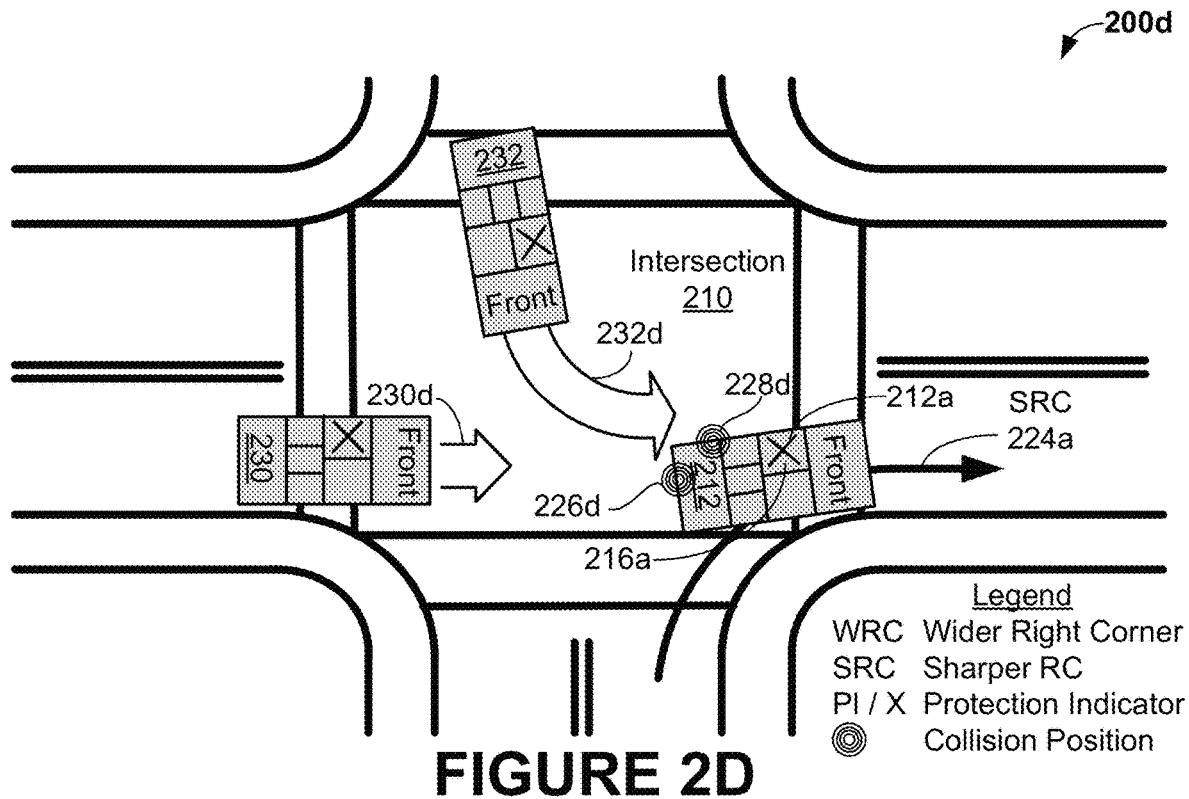
FIG. 2D shows an example scenario where the vehicle traverses the intersection via a right turn, in accordance with an example embodiment.

FIG. 2D shows scenario 200d where vehicle 212 traverses intersection 210 via a right turn, in accordance with an example embodiment. FIG. 2D also shows protection indicator 212a of an "X" to indicate an occupant position of an occupant to be protected during scenario 200b. FIG. 2D shows protection indicator 212a in position FD 216a to indicate that the front driver's side occupant position is to be protected by vehicle 212 during scenario 200b.

Vehicle 212 can protect occupant position FD 216a by selecting driving behaviors that minimize risk to and/or maximize protection of occupant position FD 216a. While vehicle 212 traverses intersection 210 via sharp right corner 224a, vehicle 230 and/or vehicle 232 could collide with vehicle 212. If vehicle 230 and/or vehicle 232 arrive in the intersection after vehicle 212 has traversed the intersection, a collision can be avoided. However if a collision occurs, an occupant in occupant position FD 216a can be better protected if collision positions 226d and/or 228d are on the passenger's side and/or at the back of vehicle 212, such as shown in FIG. 2D.

When turning right at an intersection, the autonomous vehicle can take sharp right turn 224a to potentially avoid a driver's side collision by traversing intersection 210 relatively quickly; e.g., vehicle 212 can traverse most or all of intersection 210 before vehicles 230, 232 could reach a position to potentially collide with vehicle 212. Also, by taking the sharp right turn 224a shown in FIG. 2D, additional protection for the occupant in occupant position FD 216a can be provided in event of a collision as discussed above. Vehicle 212 can select a driving behavior including sharp right turn 224a perhaps in response to a "protect driver's seat" (or similar) behavior setting for a "turn right through intersection" (or similar) driving behavior in a profile for the occupant in FD 216a.

Figure 2E:
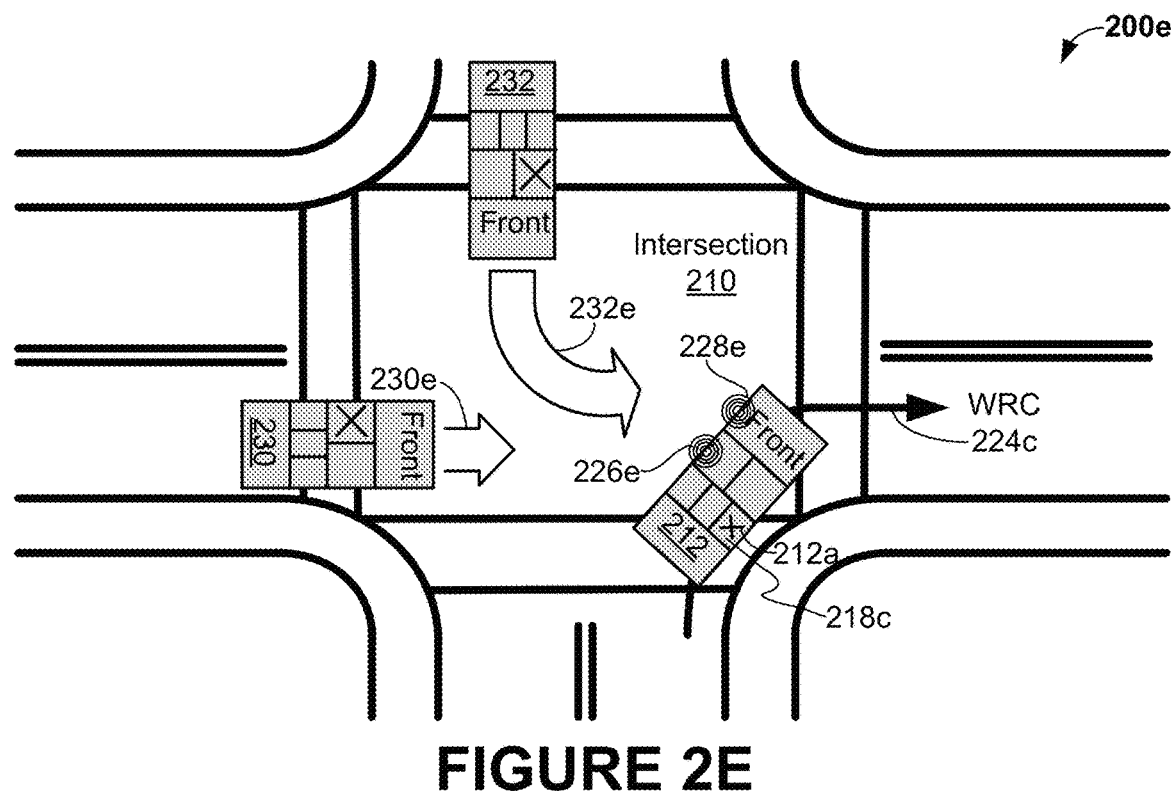
FIG. 2E shows an example scenario of a vehicle traversing an intersection via another right turn, in accordance with an example embodiment.

FIG. 2E shows scenario 200e where vehicle 212 traverses intersection 210 via a left turn, in accordance with an example embodiment. FIG. 2E shows protection indicator 212a of an "X" to indicate an occupant position of an occupant to be protected during scenario 200b. FIG. 2E shows protection indicator 212a in position BP 218c to indicate that the back passenger's side occupant position is to be protected by vehicle 212.

Vehicle 212 can protect occupant position BP 218c by selecting driving behaviors that minimize risk to and/or maximize protection of occupant position BP 218c. While vehicle 212 traverses intersection 210 via wide right corner 224c, vehicle 230 and/or vehicle 232 could collide with vehicle 212. If vehicle 230 and/or vehicle 232 arrive in the intersection after vehicle 212 has traversed the intersection, a collision can be avoided. However if a collision occurs, an occupant in occupant position BP 216c can be better protected if collision positions 226e and/or 228e are on the driver's side and/or at the front of vehicle 212, such as shown in FIG. 2E.

An example back side collision could occur if vehicle 230 traveling along direction of travel 230e were to collide with vehicle 212 at or near collision position 226e. As shown in FIG. 2E, an example right side collision could occur if vehicle 232 travels along direction of travel 232e to collide with front of vehicle 230 close to or at collision position 228e.

When turning right at an intersection, the autonomous vehicle can take wide right turn 224c to potentially avoid a passenger's side collision by traversing intersection 210 relatively quickly; e.g., vehicle 212 can traverse most or all of intersection 210 before vehicles 230, 232 could reach a position to potentially collide with vehicle 212. Also, by taking the wide right turn 224c shown in FIG. 2E, additional protection for the occupant in occupant position BP 218c can be provided in event of a collision as discussed above. Vehicle 212 can select a driving behavior including wide right turn 224c perhaps in response to a "protect back passenger's seat" (or similar) behavior setting for a "turn right through intersection" (or similar) driving behavior in a profile for the occupant in BP 218c.

Figure 3:
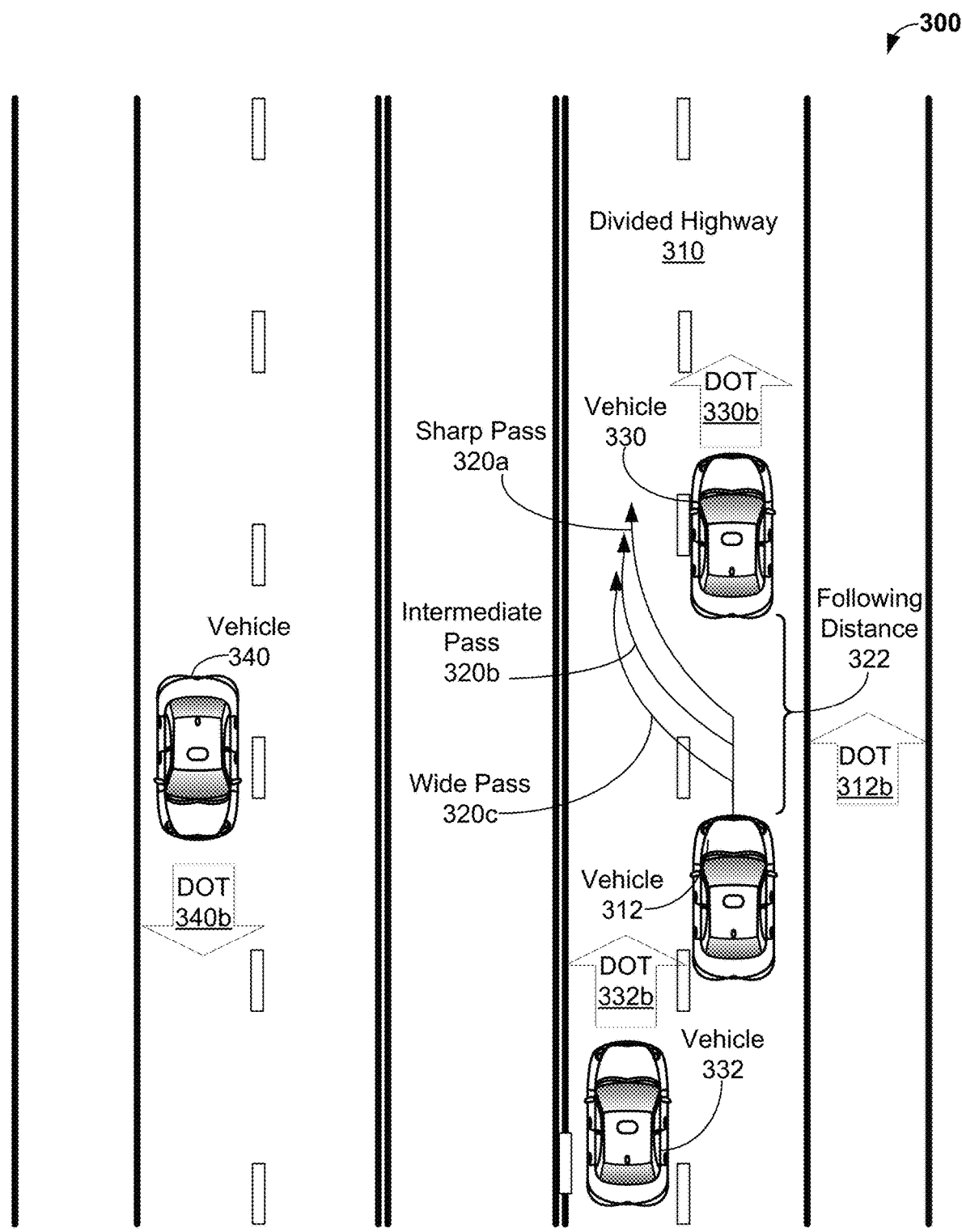
FIG. 3 shows an example scenario of a vehicle passing another vehicle, in accordance with an example embodiment.

FIG. 3 shows scenario 300 of vehicle 312 passing vehicle 330 along divided highway 310, in accordance with an example embodiment. Vehicle 312 can be an autonomous vehicle. Scenario 300 starts with vehicle 312 traveling in direction of travel (DOT) 312b, following vehicle 330 traveling in direction of travel 330*b* and with vehicle 312 following vehicle 330 at a distance of following distance 322.

Vehicle 312 can be configured to perform analyses to determine a potential harm to each a passenger during driving scenarios, such as passing vehicle 330. Vehicle 312 can determine outcome(s) that lead to the lowest overall potential harm, where the outcomes are based on vehicle 312's behavior during the driving scenarios. Then, vehicle 312 can select behavior(s) to actuate the lowest overall potential harm.

The behavior(s) can be selected based on minimizing harm and/or using information from the passenger(s), such as preferences stored in profile for the passenger(s). For example, suppose that autonomous vehicle 312 has only one passenger in the driver's seat. Vehicle 312 can select from among multiple choices of paths to pass vehicle 330, where each path choice had approximately the same potential harm. Further suppose that profile information indicated that a driver in vehicle 312 had a selection to minimize harm to any passenger(s) in the back seat. Based on this information, vehicle 312 can select paths that pass vehicle 330 that minimize harm to a passenger or passengers in the back seat. Other scenarios for determining harms, selecting path(s) that minimize harms based on preference, and traveling along path(s) that minimize harms selected based on profile information and/or other information associated with the driver.

Scenario 300 continues with vehicle 312 deciding to pass vehicle 330. Different passing trajectories can be used to pass vehicle 330. For example, FIG. 3 shows three example passing trajectories: sharp pass 320*a*, intermediate pass 320*b*, and wide pass 320*c*. Other possible choices can include, but are not limited to, utilizing a passing trajectory between sharp pass 320*a* and wide pass 320*c* not shown in FIG. 2A, taking a path for the pass that is sharper; i.e., closer to vehicle 330 than sharp pass 320*a*, and taking a path that is wider; i.e., farther from vehicle 330 than wide pass 320*c*.

Other driving behaviors related to passing can include selecting a minimum, maximum and/or average speeds while traveling along divided highway 310, selecting following distance 322, selecting an amount of time, including no time, to wait before passing, selecting different speeds/accelerations while passing, moving slightly side-to-side on a passing trajectory, stuttering while starting the pass, waiting for other vehicles; e.g., vehicle 332 to pass vehicle 330 before passing, behaviors related changing lanes after passing; e.g., returning to the right lane of divided highway 310 after passing 330, deciding whether to pass multiple vehicles at one time, and using variable speeds while passing. Other driving behaviors for passing vehicle 330 are possible as well.

In some scenarios, vehicle 312 can warn about and/or modify occupant specific settings for driving behaviors. For example, let divided highway 310 have a speed limit of 120 km/hour. Then, if an occupant of vehicle 312 attempts to set a maximum speed over the speed limit; e.g., 130 km/hour, vehicle 312 can warn the occupant a maximum allowed speed is the speed limit and/or change the maximum allowed speed setting to the speed limit of 120 km/hour.

Figure 4:
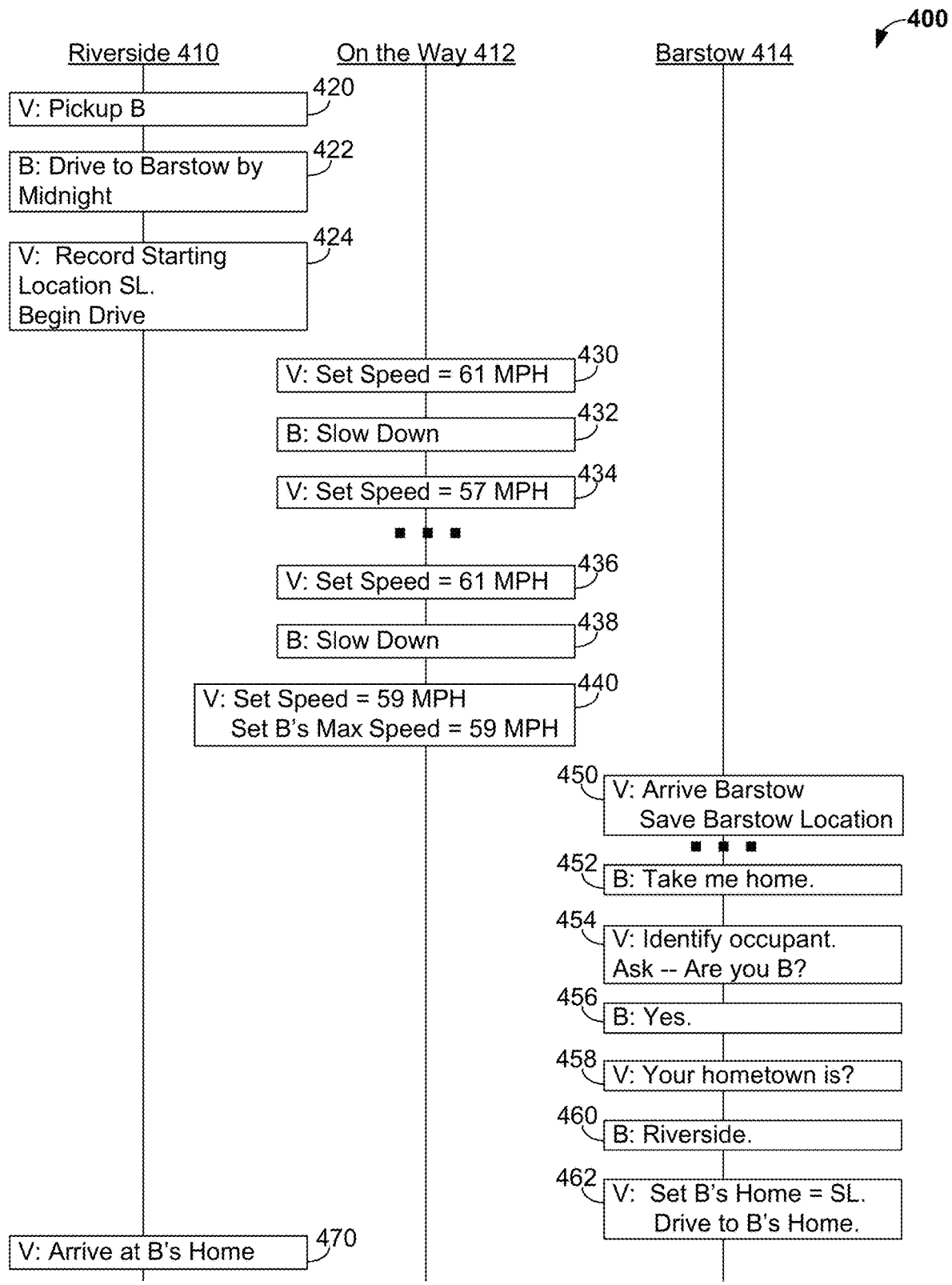
FIG. 4 is a communication diagram for communications during a roundtrip taken by an autonomous vehicle and an occupant, in accordance with an example embodiment.

FIG. 4 is a communication diagram 400 for communications during a roundtrip from Riverside, Calif., shown as "Riverside 410", to Barstow, Calif., shown as "Barstow 414" taken by an autonomous vehicle "V" and an occupant "B", in accordance with an example embodiment. Events occurring at points between Riverside and Barstow are shown in FIG. 4 as occurring at "On the Way 412."

At block 420 of FIG. 4, autonomous vehicle V picks up occupant B at Riverside 410, and occupant B of Autonomous vehicle V occupies V's driver's seat. At block 422, B instructs the autonomous vehicle to drive from Riverside, Calif. to Barstow, Calif. so as to arrive by midnight, using default profile settings. At block 424, autonomous vehicle V records and stores starting location SL, which is the location where V picked up B. Autonomous vehicle V then begins to drive to Barstow 414.

On the way to Barstow, at block 430, V attempts to set its speed to 61 miles per hour (MPH). In response, at block 432, occupant B instructs autonomous vehicle V to slow down. The autonomous vehicle slows to a speed less than 60 MPH; for example, FIG. 4 shows V setting its speed to 57 MPH at block 434.

Later, observing the desired time of arrival of midnight and the distance to be traveled, at block 436, V attempts to set its speed to 61 MPH. Again, B instructs the V to slow down at block 438. Machine learning behaviors within the autonomous vehicle can (a) determine the "slow down" command from B is a repeated command, (b) the speed that seems to trigger the "slow down" response from B is exceeding 60 MPH, and (c) consequently, set a "maximum speed" driving behavior for V in an occupant-specific profile for B to "59 MPH". Also at block 440, the speed is set to 59 MPH.

FIG. 4 shows that at block 450, V arrives at Barstow 414 and reaches a desired location within Barstow. Upon reaching the desired location, V stops and B exits V. At block 452, after some time, B re-enters V, re-occupies V's driver seat, and uses a voice interface to the autonomous vehicle to instruct the vehicle to "take me home." V can capture B's voice using a microphone within autonomous vehicle V and compare the captured voice to voice data stored with B's occupant-specific profile.

At block 454, V can identify the occupant. In some embodiments, the vehicle control system can have a one or more interface that can capture, compare, and store identification information about voice(s) of occupant(s). Occupants can then be identified based on a comparison of input identification information and stored voice information. If authorized by the occupant(s), V can listen in the background for occupant voices and attempt to identify these voices without explicitly requesting occupant identification—however, V may request verification of identification of background voice; e.g., V can output "I think I hear B is in the car. Is that right?"

For example, the autonomous vehicle can have a voice interface that, at least in part, can capture samples of voices of occupants, store the captured samples with profile(s) for occupant(s), and determine a voice print, corresponding text, and/or other characteristic information about the captured samples of voices. The voice print, text, and/or other characteristic information can also be stored with the profile(s). At a later time, an occupant can enter the autonomous vehicle, and the autonomous vehicle can, in response, ask the entering occupant to identify him or herself by voice. The entering occupant can provide identifying information; e.g., a person's name, a user identifier, or some other identifying information. Upon receiving the identifying information, the autonomous vehicle can determine a voice print, corresponding text, and/or other characteristic information based on the spoken identifying information and compare that information to information stored in occupant's profiles. Then, when the input voice print, corresponding text, and/or other characteristic information matches voice print, corresponding text, and/or other characteristic information stored in a profile, the occupant can be identified based on the input identifying information, the stored identifying information, and/or other information stored in the profile e.g., a specific occupant identifier stored in the profile. If no stored voice print, corresponding text, and/or other characteristic information is found, the entering occupant can be asked to create a profile that includes identifying information (perhaps already provided by the occupant) so that the entering occupant can later be identified.

In other embodiments, occupants can provide identifying information textually; e.g., via use of a touch screen, touch pad, keypad, or other interface that permits an occupant to enter text. The entered text can include identifying information that can be captured, stored, and compared to determine an identity of an occupant using profile-based techniques operating on text similar those discussed above operating on voices.

In still other embodiments, a camera or similar device can capture image(s) of occupants that can be stored and compared to identify occupants, such as by use of facial recognition techniques. The images can include identifying information that can be captured, stored, and compared to determine an identity of an occupant using profile-based techniques operating on images similar those discussed above operating on voices. Combinations of these voice-based, text-based, and image-based techniques and/or other techniques to identify occupants, e.g., biometric techniques, can be used as well or instead.

For example, at block 454, using a voice interfaces, V can identify B by asking B for identification information and/or verification; e.g., V can ask B "Is the occupant of the driver's seat B?" or "Are you B?"

At block 456, B can confirm B's identity by saying "Yes." Autonomous vehicle V can capture B's voice and/or image to identify B based on the voice and/or image using the voice, image, and/or text techniques discussed immediately above.

At block 458, V can verify where B's "home" is by asking B about B's home town and/or home location. Upon verifying B's identity, the vehicle can retrieve a starting location of the previous drive as Riverside, Calif., and ask B about B's hometown. B can then verify Riverside, Calif. and/or an address in Riverside, Calif. is home. At block 460, B can inform V that home is Riverside. In response, the autonomous vehicle can store the starting location SL stored at block 424 as a "home" location in B's occupant-specific profile.

After determining the home destination for B, at block 470, V can drive from Barstow 414 to location SL in Riverside, and arrive at B's home. During the drive from Barstow to Riverside, V can drive at a maximum speed of 59 MPH based on the maximum speed previously stored in B's profile (at step 440). Other machine learning behaviors are possible as well. For example, machine learning techniques can be utilized to learn and store occupant-specific data determined by the techniques, such as but not limited to and store occupant-specific data for minimum, average, and maximum speeds, preferences related to traversing intersections such as discussed above in the context of FIGS. 2A-2E, passing trajectories such as discussed above in detail in the context of FIG. 3, and/or other locations and occupant-specific names for locations; e.g., locations for "work", "school", "the store", "Dad's house", "the mall", etc. Many other machine-learning techniques and/or data for storage are possible as well.

Figure 5A:
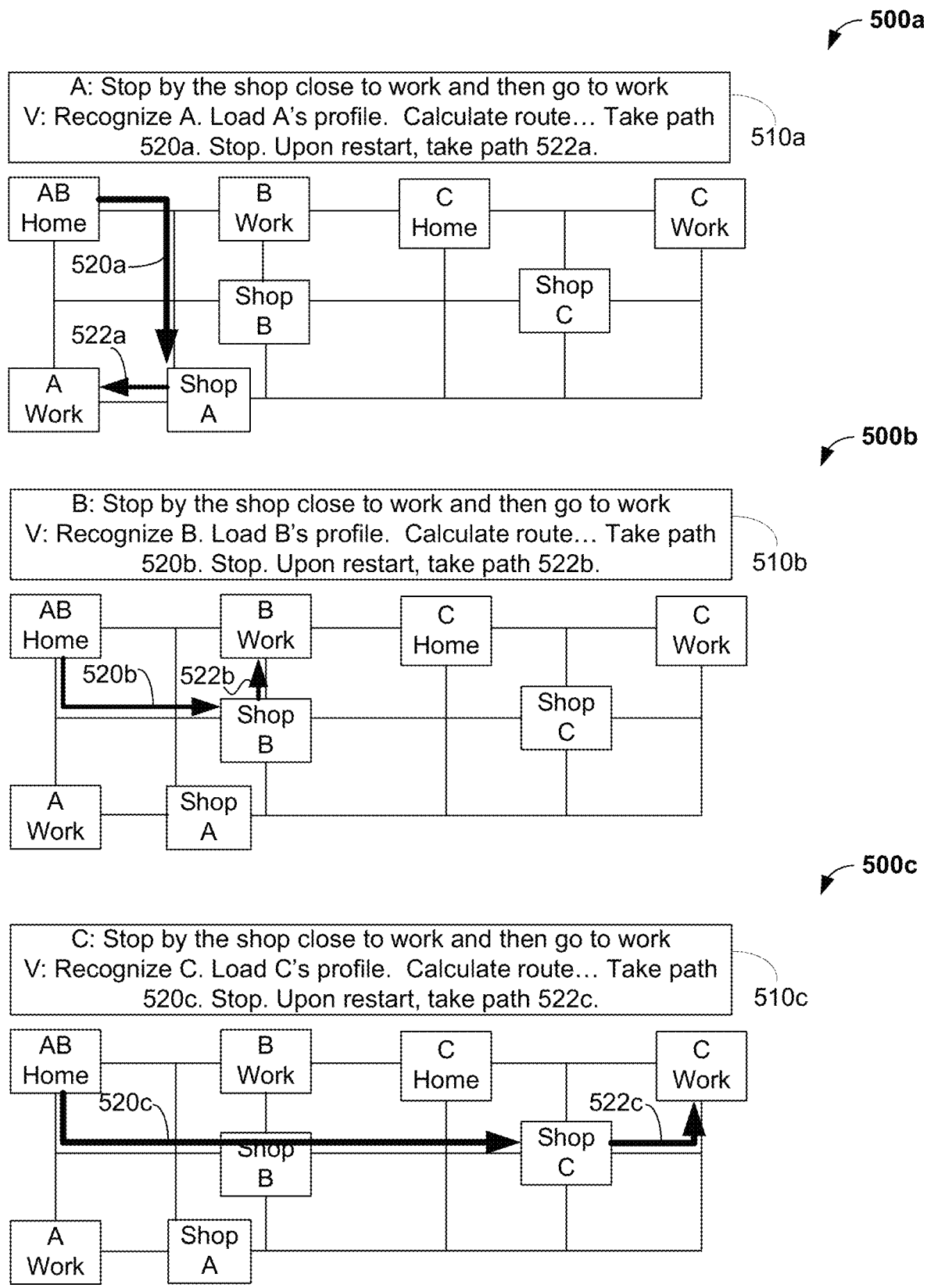
FIGS. 5A and 5B each show example scenarios involving an autonomous vehicle performing occupant-specific route generation and traversal, in accordance with example embodiments.
Figure 5B:
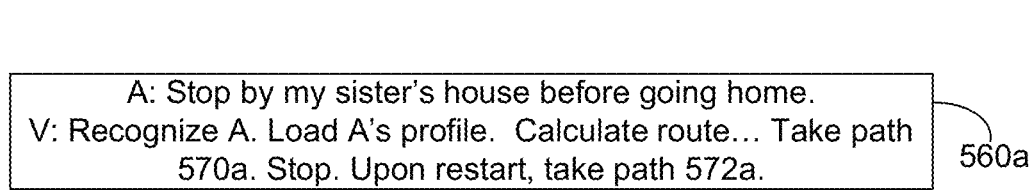
Figure 5B:
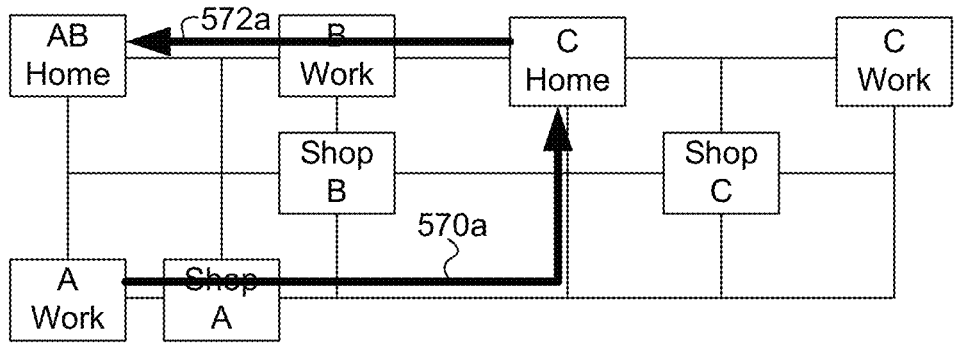
Figure 5B:
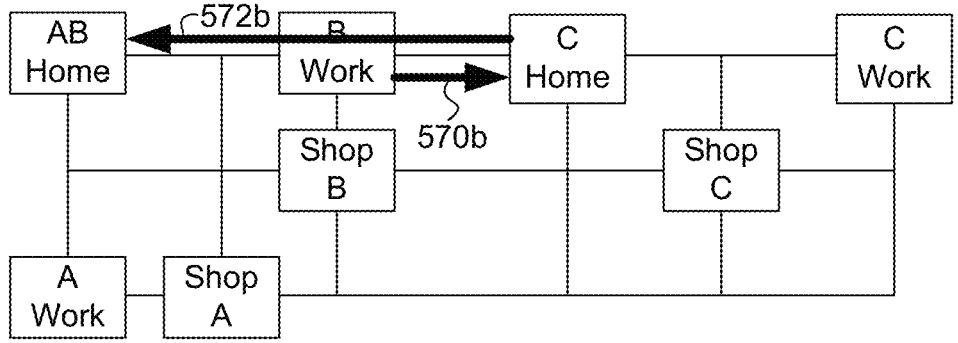

FIG. 5A shows example scenarios 500a, 500b, 500c involving an autonomous vehicle performing occupant-specific route generation and traversal, in accordance with an example embodiment. Each of the locations and roads shown schematically on diagrams 500a, 500b, 500c of FIG. 5A and diagrams 550a, 550b, and 550c of FIG. 5B are the same.

In scenarios 500a, 500b, 500c, 550a, 550b, and 550c, three sisters A, B, and C share an autonomous vehicle VABC that has profiles for each of A, B, and C. As shown in both FIGS. 5A and 5B, sisters A and B share a home indicated as "AB Home" shown at the top left-hand side of the diagram for scenarios 500a and 550a and sister C lives in a separate location, "C Home", shown at the top near the middle of the diagram for scenarios 500a and 550a. Each sister works at a separate location: sister A works at a location "A Work" shown at the bottom left-hand side of the diagram for scenarios 500a and 550a, sister B works at a location "B Work" shown at the top left-hand side near "AB Home" in the diagram for scenarios 500a and 550a, and sister C works at a location "C Work" shown at the top right-hand corner of the diagram for scenarios 500a and 550a.

Each of A, B, and C's profiles include personal preferences such as discussed above, as well as information about routing. The routing information in the profile for A associates: (a1) the term "home" with the "AB Home" location, (a2) the term "work" with the "A Work" location, (a3) the term "my sister's house" with the "C Home" location and (a4) a "shop close to work" with the location labeled "Shop A" shown at the bottom left-hand side of the diagram for scenario 500a.

The routing information in the profile for B associates: (b1) the term "home" with the "AB Home" location labeled "AB Home", (b2) the term "work" with the location labeled "B Work", (b3) the term "my sister's house" with the location labeled "C Home", and (b4) a "shop close to work" with the location labeled "Shop B" shown in the middle left portion of the diagram for scenario 500a just below "B Work".

The routing information in the profile for C associates: (c1) the term "home" with the location labeled "C Home", (c2) the term "work" with the "C Work" location, (a3) the term "my sister's house" with the location of "AB Home", and (a4) a "shop close to work" with the location labeled "Shop C" shown in the middle right portion of the diagram for scenario 500a between and below "C Home" and "C Work".

In scenarios 500a, 500b, and 500c, each of sisters A, B, and C start at the location AB Home with autonomous vehicle VABC and give VABC the same instruction "Stop by the shop close to work and then go to work." FIG. 5A shows a path taken by VABC using a relative dark line superimposed over roads of the diagrams for scenarios 500a, 500b, and 500c. As can be seen from FIG. 5A, the same command leads to three different routes depending on the occupant of VABC. The occupant of VABC can be identified using the voice-based, text-base, image-based, and/or other techniques discussed above at least in the context of blocks 454 and 456 of FIG. 4.

In scenario 500a of FIG. 5A, sister A occupies autonomous vehicle VABC at her home, AB Home, and instructs VABC to "Stop by the shop close to work and then go to work" as shown in block 510a. In response, and as also shown in block 510a, VABC looks up the locations of the "shop close to work" and "work" in a profile for sister A, determines the location of the "shop close to work" is Shop A and the location of "work" is A Work, determines route

520*a* from a starting location of AB Home to Shop A, determines route 522*a* from Shop A to destination A Work, and travels along route 520*a* to stop at Shop A. Upon arriving at Shop A, A exits VABC, stays at Shop A for a period of time, and then reenters VABC. Upon A's reentry, VABC continues on to A Work via route 522*a* and stops. A then exits VABC.

In scenario 500*b* of FIG. 5A, sister B occupies autonomous vehicle VABC at her home, AB Home, and instructs VABC to "Stop by the shop close to work and then go to work" as shown in block 510*b*. In response, and as also shown in block 510*b*, VABC looks up the locations of the "shop close to work" and "work" in a profile for sister B, determines the location of the "shop close to work" is Shop B and the location of "work" is B Work, determines route 520*b* from a starting location of AB Home to Shop B, determines route 522*b* from Shop B to destination B Work, and travels along route 520*b* to stop at Shop B. Upon arriving at Shop B, B exits VABC, stays at Shop B for a period of time, and then reenters VABC. Upon B's reentry, VABC continues on to B Work via route 522*b* and stops. B then exits VABC.

In scenario 500*c* of FIG. 5A, sister C occupies autonomous vehicle VABC at her sisters' home, AB Home, and instructs VABC to "Stop by the shop close to work and then go to work" as shown in block 510*c*. In response, and as also shown in block 510*c*, VABC looks up the locations of the "shop close to work" and "work" in a profile for sister C, determines the location of the "shop close to work" is Shop C and the location of "work" is C Work, determines route 520*c* from a starting location of AB Home to Shop C, determines route 522*c* from Shop C to destination C Work, and travels along route 520*c* to Shop C. Upon arriving at Shop C, C exits VABC, stays at Shop C for a period of time, and then reenters VABC. Upon C's reentry, VABC continues on to C Work via route 522*c* and stops. C then exits VABC.

FIG. 5B shows example scenarios 550*a*, 550*b*, 550*c* involving an autonomous vehicle performing occupant-specific route generation and traversal, in accordance with an example embodiment. In scenarios 550*a*, 550*b*, and 550*c*, autonomous vehicle VABC is shared by sisters A, B, and C, and the profile information for A, B, and C is stored within VABC as discussed above in the context of FIG. 5A.

In scenarios 550*a*, 550*b*, and 550*c*, each of sisters A, B, and C start their respective work locations with autonomous vehicle VABC and give VABC the same instruction "Stop by my sister's house before going home." The occupant of VABC can be identified using the voice-based, text-base, image-based, and/or other techniques discussed above at least in the context of blocks 454 and 456 of FIG. 4.

FIG. 5B shows a path taken by VABC using a relatively dark line superimposed over roads of the diagrams for scenarios 550*a*, 550*b*, and 550*c*. As can be seen from FIG. 5B, the same command from each sister leads to three different routes depending on the occupant of VABC.

In scenario 550*a* of FIG. 5B, sister A occupies autonomous vehicle VABC at her work location, A Work, and instructs VABC to "Stop by my sister's house before going home" as shown in block 560*a*. In response, and as also shown in block 560*a*, VABC looks up the locations of the "my sister's house" and "home" in a profile for sister A, determines the location of "my sister's house" is "C Home" and the location of "home" is AB Home, determines route 570*a* from a starting location of A Work to C Home, determines route 572*a* from C Home to destination AB Home, and travels along route 570*a* to stop at C Home. Upon arriving at C Home, A exits VABC, stays at C Home for a period of time, and then reenters VABC. Upon A's reentry, VABC continues on to AB Home via route 572*a* and stops. A then exits VABC.

In scenario 550*b* of FIG. 5B, sister B occupies autonomous vehicle VABC at her work location, B Work, and instructs VABC to "Stop by my sister's house before going home" as shown in block 560*b*. In response, and as also shown in block 560*b*, VABC looks up the locations of the "my sister's house" and "home" in a profile for sister B, determines the location of "my sister's house" is "C Home" and the location of "home" is AB Home, determines route 570*b* from a starting location of B Work to C Home, determines route 572*b* from C Home to destination AB Home, and travels along route 570*b* to stop at C Home. Upon arriving at C Home, B exits VABC, stays at C Home for a period of time, and then reenters VABC. Upon B's reentry, VABC continues on to AB Home via route 572*b* and stops. B then exits VABC.

In scenario 550*c* of FIG. 5B, sister C occupies autonomous vehicle VABC at her work location, C Work, and instructs VABC to "Stop by my sister's house before going home" as shown in block 560*c*. In response, and as also shown in block 560*c*, VABC looks up the locations of the "my sister's house" and "home" in a profile for sister C, determines the location of "my sister's house" is "AB Home" and the location of "home" is C Home, determines route 570*c* from a starting location of C Work to AB Home, determines route 572*c* from AB Home to destination C Home, and travels along route 570*c* to stop at AB Home. Upon arriving at AB Home, C exits VABC, stays at AB Home for a period of time, and then reenters VABC. Upon C's reentry, VABC continues on to C Home via route 572*b* and stops. C then exits VABC.

In some scenarios, VABC determines routes in a "lazy" fashion. For example, in scenario 500*a*, instead of determining routes 520*a* and 522*a* before traveling along route 520*a* (and later route 520*a*), VABC can determine route 520*a*, take route 520*a*, determine route 522*a* after taking route 520*a*, and then take route 522*a*.

Example Vehicle Systems

Figure 6:
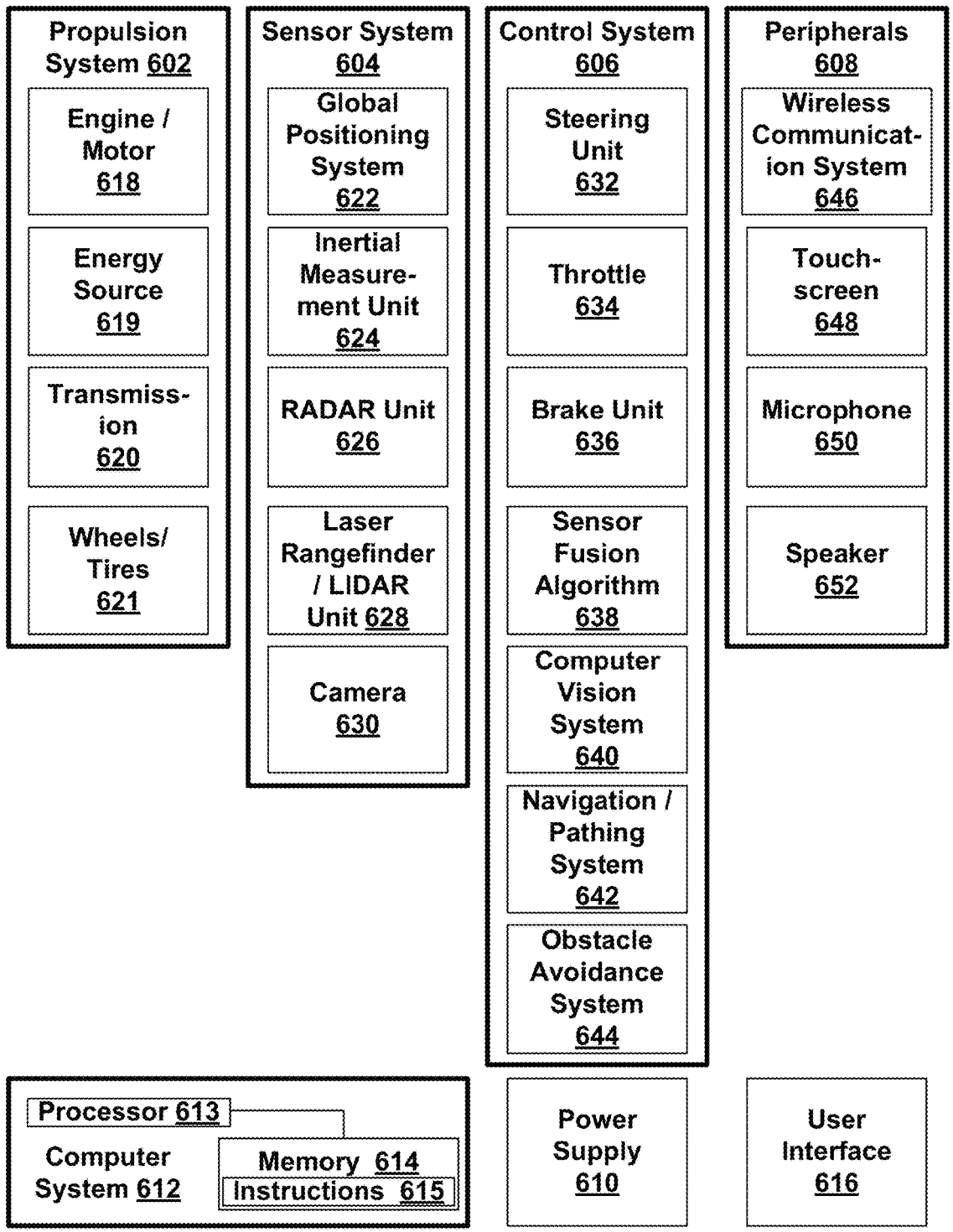
FIG. 6 is a functional block diagram illustrating a vehicle, according to an example embodiment.

FIG. 6 is a simplified block diagram of an example vehicle 600, in accordance with an example embodiment. Components coupled to or included in the vehicle 600 may include a propulsion system 602, a sensor system 604, a control system 606, peripherals 608, a power supply 610, a computer system 612, and a user interface 616. The computer system 612 may include a processor 613, and a memory 614. The memory 614 may include instructions 615 executable by the processor 613. Components of the vehicle 600 may be configured to work in an interconnected fashion with each other and/or with other components coupled to respective systems. For example, the power supply 610 may provide power to all the components of the vehicle 600. The computer system 612 may be configured to receive information from and control the propulsion system 602, the sensor system 604, the control system 606, and the peripherals 608. The computer system 612 may be configured to generate a display of images on and receive inputs from the user interface 616.

In other examples, the vehicle 600 may include more, fewer, or different systems, and each system may include more, fewer, or different components. Additionally, the systems and components shown may be combined or divided in any number of ways.

The propulsion system 602 may be configured to provide powered motion for the vehicle 600. As shown, the propulsion system 602 includes an engine/motor 618, an energy source 619, a transmission 620, and wheels/tires 621. The propulsion system 602 may additionally or alternatively include components other than those shown.

The engine/motor 618 may be or include any combination of an internal combustion engine, an electric motor, a steam engine, and a Stirling engine. Other motors and engines are possible as well. In some examples, the propulsion system 602 could include multiple types of engines and/or motors. For instance, a gas-electric hybrid car could include a gasoline engine and an electric motor. Other examples are possible.

The energy source 619 may be a source of energy that powers the engine/motor 618 in full or in part. That is, the engine/motor 618 may be configured to convert the energy source 619 into mechanical energy. Examples of energy sources 619 include gasoline, diesel, other petroleum-based fuels, propane, other compressed gas-based fuels, ethanol, solar panels, batteries, and other sources of electrical power. The energy source(s) 619 could additionally or alternatively include any combination of fuel tanks, batteries, capacitors, and/or flywheels. In some examples, the energy source 619 may provide energy for other systems of the vehicle 600 as well.

The transmission 620 may be configured to transmit mechanical power from the engine/motor 618 to the wheels/tires 621. To this end, the transmission 620 may include a gearbox, clutch, differential, drive shafts, and/or other elements. In examples where the transmission 620 includes drive shafts, the drive shafts could include one or more axles that are configured to be coupled to the wheels/tires 621.

The wheels/tires 621 of vehicle 600 could be configured in various formats, including a unicycle, bicycle/motorcycle, tricycle, or car/truck four-wheel format. Other wheel/tire formats are possible as well, such as those including six or more wheels. The wheels/tires 621 of vehicle 600 may be configured to rotate differentially with respect to other wheels/tires 621. In some examples, the wheels/tires 621 may include at least one wheel that is fixedly attached to the transmission 620 and at least one tire coupled to a rim of the wheel that could make contact with the driving surface. The wheels/tires 621 may include any combination of metal and rubber, or combination of other materials.

The sensor system 604 may include a number of sensors configured to sense information about an environment in which the vehicle 600 is located. As shown, the sensors of the sensor system include a Global Positioning System (GPS) module 622, an inertial measurement unit (IMU) 624, a RADAR unit 626, a laser rangefinder and/or LIDAR unit 628, a camera 630, and actuators (not shown in FIG. 6) configured to modify a position and/or orientation of the sensors. The sensor system 604 may include additional sensors as well, including, for example, sensors that monitor internal systems of the vehicle 600 (e.g., an oxygen monitor, a fuel gauge, an engine oil temperature, etc.). The sensor system 604 may additionally or alternatively include components other than those shown. Other sensors are possible as well The GPS module 622 may be any sensor configured to estimate a geographic location of the vehicle 600. To this end, the GPS module 622 may include a transceiver configured to estimate a position of the vehicle 600 with respect to the Earth, based on satellite-based positioning data. In an example, the computer system 612 may be configured to use the GPS module 622, perhaps in combination with other data, such as map data stored in memory 614 (not shown in FIG. 6), to estimate a location of a lane boundary on road on which the vehicle 600 may be travelling on. The GPS module 622 may take other forms as well.

The IMU 624 may be any combination of sensors configured to sense position and orientation changes of the vehicle 600 based on inertial acceleration. In some examples, the combination of sensors may include, for example, accelerometers and gyroscopes. Other combinations of sensors are possible as well.

The RADAR unit 626 may be any sensor configured to sense objects in the environment in which the vehicle 600 is located using radio signals. In some examples, in addition to sensing the objects, the RADAR unit 626 may additionally be configured to sense the speed and/or direction of motion of the objects.

Similarly, the laser rangefinder or LIDAR unit 628 may be any sensor configured to sense objects in the environment in which the vehicle 600 is located using lasers. In particular, the laser rangefinder or LIDAR unit 628 may include a laser source and/or laser scanner configured to emit a laser and a detector configured to detect reflections of the laser. The laser rangefinder or LIDAR 628 may be configured to operate in a coherent (e.g., using heterodyne detection) or an incoherent detection mode.

The camera 630 may be any camera (e.g., a still camera, a video camera, etc.) configured to capture images of the environment in which the vehicle 600 is located. In some embodiments, camera 630 can be configured to capture images within a passenger compartment of vehicle 600; for example, to capture images of occupants for identification and profile lookup. To this end, the camera may take any of the forms described above. In other embodiments, camera 630 can include one or more depth cameras, e.g., stereo and/or structured light cameras. In particular embodiments, depth cameras can be configured to sense the interior of vehicle 600.

The control system 606 may be configured to control operation of the vehicle 600 and its components. To this end, the control system 606 may include a steering unit 632, a throttle 634, a brake unit 636, a sensor fusion algorithm 638, a computer vision system 640, a navigation or pathing system 642, and an obstacle avoidance system 644.

The steering unit 632 may be any combination of mechanisms configured to adjust the heading or direction of the vehicle 600. The throttle 634 may be any combination of mechanisms configured to control the operating speed and acceleration of the engine/motor 618 and, in turn, the speed and acceleration of the vehicle 600.

The brake unit 636 may be any combination of mechanisms configured to decelerate the vehicle 600. For example, the brake unit 636 may use friction to slow the wheels/tires 621. As another example, the brake unit 636 may be configured to be regenerative and convert the kinetic energy of the wheels/tires 621 to electric current. The brake unit 636 may take other forms as well.

The sensor fusion algorithm 638 may include an algorithm (or a computer program product storing an algorithm) executable by the computer system 612, for example. The sensor fusion algorithm 638 may be configured to accept data from the sensor system 604 as an input. The data may include, for example, data representing information sensed at the sensors of the sensor system 604. The sensor fusion algorithm 638 may include, for example, a Kalman filter, a Bayesian network, or another algorithm. The sensor fusion algorithm 638 further may be configured to provide various assessments based on the data from the sensor system 604, including, for example, evaluations of individual objects and/or features in the environment in which the vehicle 600 is located, evaluations of particular situations, and/or evaluations of possible impacts based on particular situations. Other assessments are possible as well The computer vision system 640 may be any system configured to process and analyze images captured by the camera 630 in order to identify objects and/or features in the environment in which the vehicle 600 is located, including, for example, lane information, traffic signals and obstacles. To this end, the computer vision system 640 may use an object recognition algorithm, a Structure from Motion (SFM) algorithm, video tracking, or other computer vision techniques. In some examples, the computer vision system 640 also may be configured to map the environment, track objects, estimate the speed of objects, etc.

The navigation and pathing system 642 may be any system configured to determine a driving path for the vehicle 600. The navigation and pathing system 642 may additionally be configured to update the driving path dynamically while the vehicle 600 is in operation. In some examples, the navigation and pathing system 642 may be configured to incorporate data from the sensor fusion algorithm 638, the GPS module 622, and one or more predetermined maps so as to determine the driving path for the vehicle 600.

The obstacle avoidance system 644 may be any system configured to identify, evaluate, and avoid or otherwise negotiate obstacles in the environment in which the vehicle 600 is located.

The control system 606 may additionally or alternatively include components other than those shown.

Peripherals 608 may be configured to allow the vehicle 600 to interact with external sensors, other vehicles, and/or a user. To this end, the peripherals 608 may include, for example, a wireless communication system 646, a touchscreen 648, a microphone 650, and/or a speaker 652.

The wireless communication system 646 may be any system configured to be wirelessly coupled to one or more other vehicles, sensors, or other entities, either directly or via a communication network. To this end, the wireless communication system 646 may include an antenna and a chipset for communicating with the other vehicles, sensors, or other entities either directly or over an air interface. The chipset or wireless communication system 646in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 646 may take other forms as well.

The touchscreen 648 may be used by a user to input commands to the vehicle 600. To this end, the touchscreen 648 may be configured to sense at least one of a position and a movement of a user's finger via capacitive sensing, resistance sensing, or a surface acoustic wave process, among other possibilities. The touchscreen 648 may be capable of sensing finger movement in a direction parallel or planar to the touchscreen surface, in a direction normal to the touchscreen surface, or both, and may also be capable of sensing a level of pressure applied to the touchscreen surface. The touchscreen 648 may be formed of one or more translucent or transparent insulating layers and one or more translucent or transparent conducting layers. The touchscreen 648 may take other forms as well The microphone 650 may be configured to receive audio (e.g., a voice command or other audio input) from a user of the vehicle 600. Similarly, the speakers 652 may be configured to output audio to the user of the vehicle 600.

The peripherals 608 may additionally or alternatively include components other than those shown.

The power supply 610 may be configured to provide power to some or all of the components of the vehicle 600. To this end, the power supply 610 may include, for example, a rechargeable lithium-ion or lead-acid battery. In some examples, one or more banks of batteries could be configured to provide electrical power. Other power supply materials and configurations are possible as well. In some examples, the power supply 610 and energy source 620 may be implemented together, as in some all-electric cars.

The processor 613 included in the computer system 612 may include one or more general-purpose processors and/or one or more special-purpose processors. To the extent the processor 613 includes more than one processor; such processors could work separately or in combination. The computer system 612 may be configured to control functions of the vehicle 600 based on input received through the user interface 616, for example. In some embodiments, user interface 616 includes some or all of the peripherals 608; e.g., touch screen 648, microphone 650, and/or speaker 652. In particular, touch screen 648 and/or similar devices (keyboards, displays, computer mouse(s), etc.) can be used, in combination with suitable software, to provide a text-based aspect of user interface 616. Further, microphone 650 and/or speaker 652 can be used, in combination with appropriate software, such as voice printing, vocal analysis, and/or automatic speech recognition (ASR) software, to provide a text-based aspect of user interface 616.

The memory 614, in turn, may include one or more volatile and/or one or more non-volatile storage components, such as optical, magnetic, and/or organic storage, and the memory 614 may be connected, partially integrated, and/or wholly integrated with the processor 613. The memory 614 may contain the instructions 615 (e.g., program logic) executable by the processor 613 to execute various vehicle functions.

The components of the vehicle 600 could be configured to work in an interconnected fashion with other components within and/or outside their respective systems. To this end, the components and systems of the vehicle 600 may be communicatively linked together by a system bus, network, and/or other connection mechanism (not shown).

Further, while each of the components and systems are shown to be integrated in the vehicle 600, in some examples, one or more components or systems may be removably mounted on or otherwise connected (mechanically or electrically) to the vehicle 600 using wired or wireless connections.

The vehicle 600 may include one or more elements in addition to or instead of those shown. For example, the vehicle 600 may include one or more additional interfaces and/or power supplies. Other additional components are possible as well. In these examples, the memory 614 may further include instructions executable by the processor 613 to control and/or communicate with the additional components.

Figure 7:
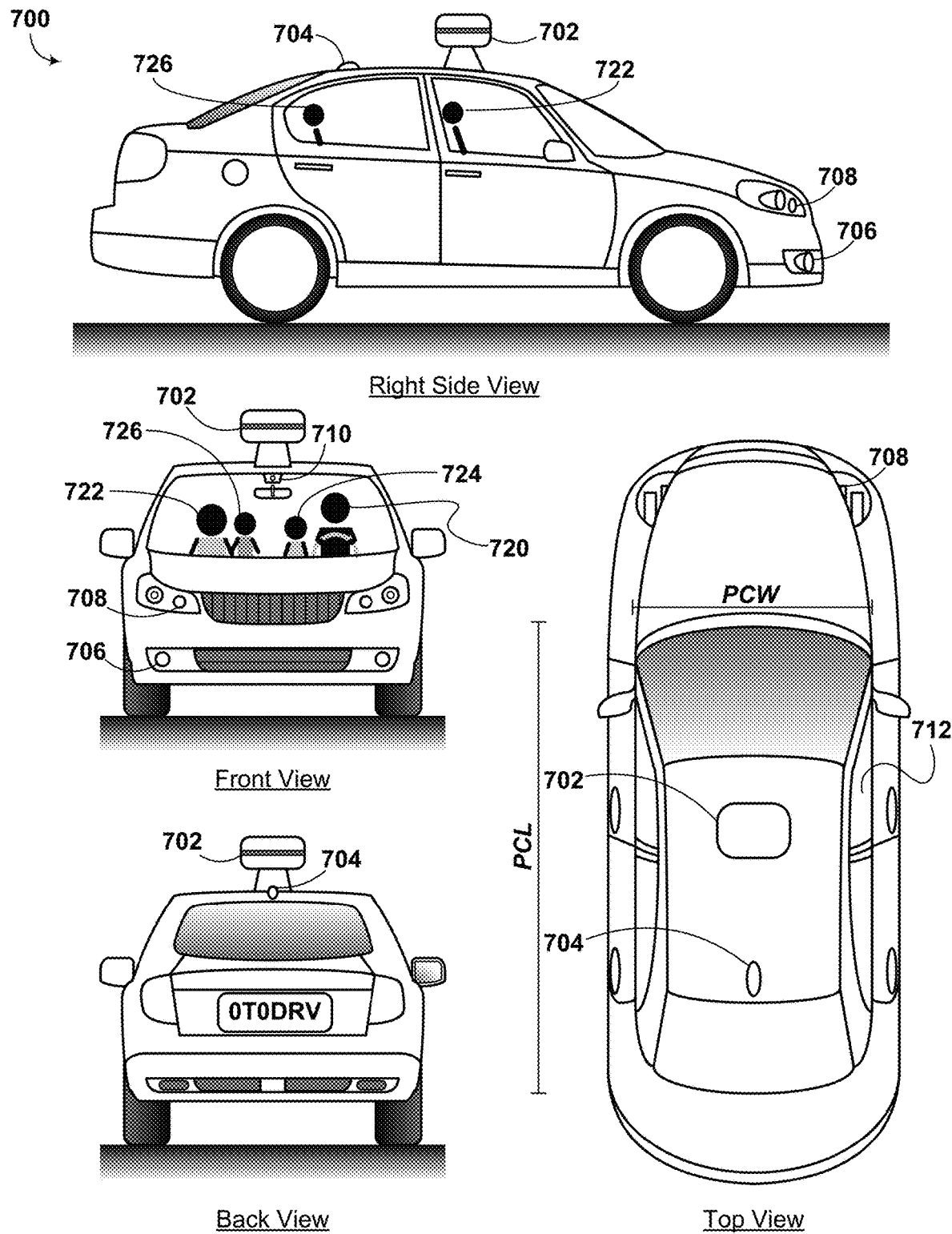
FIG. 7 shows a vehicle that can be similar or identical to the vehicle described with respect to FIG. 6, in accordance with an example embodiment.

FIG. 7 illustrates an example vehicle 700, in accordance with an embodiment. In particular, FIG. 7 shows a Right Side View, Front View, Back View, and Top View of the vehicle 700. Although vehicle 700 is illustrated in FIG. 7 as an automobile, other examples are possible. For instance, the vehicle 700 could represent a truck, motorcycle, off-road vehicle, bus, boat, airplane, helicopter, lawn mower, recreational vehicle, amusement park vehicle, farm vehicle, construction vehicle, tram, golf cart, train, trolley, or some other vehicle. As shown, the vehicle 700 includes a first sensor unit 702, a second sensor unit 704, a third sensor unit 706, a wireless communication system 708, a camera 710, and a passenger compartment 712. In some embodiments, vehicle 700 can include one or more other components in addition to or instead of those shown.

Each of the first, second, and third sensor units 702-706 may include any combination of global positioning system sensors, inertial measurement units, RADAR units, laser rangefinders, LIDAR units, cameras, lane detection sensors, and acoustic sensors. Other types of sensors are possible as well.

While the first, second, and third sensor units 702 are shown to be mounted in particular locations on the vehicle 700, in some examples the sensor unit 702 may be mounted elsewhere on the vehicle 700, either inside or outside the vehicle 700. Further, while only three sensor units are shown, in some examples more or fewer sensor units may be included in the vehicle 700.

In some examples, one or more of the first, second, and third sensor units 702-706 may include one or more movable mounts on which the sensors may be movably mounted. The movable mount may include, for example, a rotating platform. Sensors mounted on the rotating platform could be rotated so that the sensors may obtain information from each direction around the vehicle 700. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 702-706 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 708 may be any system configured to wirelessly couple to one or more other vehicles, sensors, or other entities, either directly or via a communication network as described above with respect to the wireless communication system 646 in FIG. 6. While the wireless communication system 708 is shown to be positioned on a roof of the vehicle 700, in other examples the wireless communication system 708 could be located, fully or in part, elsewhere.

The camera 710 may be any camera (e.g., a still camera, a video camera, etc.) configured to capture images of the environment in which the vehicle 700 is located. To this end, the camera 710 may be configured to detect visible light, or may be configured to detect light from other portions of the spectrum, such as infrared or ultraviolet light. Other types of cameras are possible as well. The camera 710 may be a two-dimensional detector, or may have a three-dimensional spatial range. In some examples, the camera 710 may be, for example, a range detector configured to generate a two-dimensional image indicating a distance from the camera 710 to a number of points in the environment. To this end, the camera 710 may use one or more range detecting techniques. For example, the camera 710 may use a structured light technique in which the vehicle 700 illuminates an object in the environment with a predetermined light pattern, such as a grid or checkerboard pattern and uses the camera 710 to detect a reflection of the predetermined light pattern off the object. Based on distortions in the reflected light pattern, the vehicle 700 may determine the distance to the points on the object. The predetermined light pattern may include infrared light, or light of another wavelength.

As another example, the camera 710 may use a laser scanning technique in which the vehicle 700 emits a laser and scans across a number of points on an object in the environment. While scanning the object, the vehicle 700 uses the camera 710 to detect a reflection of the laser off the object for each point. Based on a length of time it takes the laser to reflect off the object at each point, the vehicle 700 may determine the distance to the points on the object.

As yet another example, the camera 710 may use a time-of-flight technique in which the vehicle 700 emits a light pulse and uses the camera 710 to detect a reflection of the light pulse off an object at a number of points on the object. In particular, the camera 710 may include a number of pixels, and each pixel may detect the reflection of the light pulse from a point on the object. Based on a length of time it takes the light pulse to reflect off the object at each point, the vehicle 700 may determine the distance to the points on the object. The light pulse may be a laser pulse, for example. Other range detecting techniques are possible as well, including stereo triangulation, sheet-of-light triangulation, interferometry, and coded aperture techniques, among others. The camera 710 may take other forms as well.

In some examples, the camera 710 may include a movable mount and/or an actuator configured to adjust the position and/or orientation of the camera 710. While FIG. 7 shows camera 710 mounted inside a front windshield of the vehicle 700, in other examples the camera 710 may be mounted elsewhere on the vehicle 700, either inside or outside the vehicle 700.

FIG. 7 shows vehicle 700 with passenger compartment 712 having a passenger compartment length PCL and a passenger compartment width PCW. In some scenarios, such as shown in FIG. 7, passengers can ride vehicle 700 inside of passenger compartment 712. The passengers can include driver 720, a front passenger 722, and back passengers 724, 726. In other scenarios not shown in FIG. 7, more or fewer passengers can be inside passenger compartment 712.

A control system of the vehicle 700 may be configured to control the vehicle 700 in accordance with a given driving behavior from among multiple possible driving behaviors. The control system may be configured to receive information from sensors coupled to the vehicle 700 (on or off the vehicle 700), select a driving behavior based on the information, and control the vehicle 700 in accordance with the selected driving behavior. The control system further may be configured to continuously monitor the information received from the sensors to continuously evaluate driving conditions and also may be configured to modify the driving behavior or select another driving behavior based on changes in the driving conditions.

CONCLUSION

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   determining, by a computing system of a vehicle comprising a passenger compartment, a location of an occupant within the passenger compartment, wherein the vehicle is operating in an autonomous mode;
   identifying a plurality of possible trajectories for the vehicle to traverse an intersection, wherein the possible trajectories comprise at least a first trajectory and a second trajectory;
   determining, based on the first trajectory and the location of the occupant within the passenger compartment, a first potential collision risk that: (a) corresponds to potential collision between the vehicle and an object while traversing the intersection using the first trajectory, and (b) indicates a risk of harm to the occupant in the passenger compartment that is associated with the potential collision;
   determining, based on the second trajectory and the location of the occupant within the passenger compartment, a second potential collision risk that: (a) corresponds to respective potential collision between the vehicle and the object while traversing the intersection using the second trajectory, and (b) indicates a risk of harm to the occupant in the passenger compartment that is associated with the respective potential collision; and
   selecting, by the computing system, a trajectory from the first trajectory and the second trajectory based on identifying a lower potential collision risk of the first potential collision risk and the second potential collision risk; and
   controlling, by the computing system, the vehicle in the autonomous mode to traverse the intersection following the selected trajectory.

2. The method of claim 1, wherein the first trajectory and the second trajectory specify different directions of travel.

3. The method of claim 2, wherein the different directions of travel comprise a sharp turn or a wide turn through the intersection.

4. The method of claim 1, wherein the first trajectory and the second trajectory specify different speeds of travel through the intersection.

5. The method of claim 1, wherein selecting the trajectory comprises:
   determining that the occupant is in a driver's seat of the vehicle; and
   determining that a right turn at the intersection is to be performed; and
   selecting a path for the right turn through the intersection that enhances safety of the occupant in the driver's seat.

6. The method of claim 5, wherein the first trajectory for the right turn comprises a sharp turn path for the right turn, and wherein the second trajectory comprises a wide turn path for the right turn.

7. The method of claim 1, wherein controlling the vehicle to traverse the intersection following the selected trajectory moves a location of a potential collision farther from the location of the occupant within the passenger compartment.

8. The method of claim 1, wherein determining the location of the occupant is based on one or more images captured by an image-capture device disposed within the passenger compartment.

9. The method of claim 1, wherein determining the location of the occupant is based on a weight sensor indicating presence of the occupant at a particular location within the passenger compartment.

10. The method of claim 1, wherein determining the location of the occupant is based on determining a door from which the occupant entered the vehicle.

11. The method of claim 1, further comprising:
determining presence of the occupant of the passenger compartment, wherein determining the presence of the occupant is based on detecting an electronic device associated with the occupant.

12. A non-transitory computer-readable storage medium having stored thereon program instructions that, upon execution by a computer system controlling a vehicle in an autonomous mode of operation, cause the computer system to perform operations comprising:
determining, a location of an occupant within a passenger compartment of the vehicle;
identifying a plurality of possible trajectories for the vehicle to traverse an intersection, wherein the possible trajectories comprise at least a first trajectory and a second trajectory;
determining, based on the first trajectory and the location of the occupant within the passenger compartment, a first potential collision risk that: (a) corresponds to potential collision between the vehicle and an object while traversing the intersection using the first trajectory, and (b) indicates a risk of harm to the occupant in the passenger compartment that is associated with the potential collision;
determining, based on the second trajectory and the location of the occupant within the passenger compartment, a second potential collision risk that: (a) corresponds to respective potential collision between the vehicle and the object while traversing the intersection using the second trajectory, and (b) indicates a risk of harm to the occupant in the passenger compartment that is associated with the respective potential collision;
selecting a trajectory from the first trajectory and the second trajectory based on identifying a lower potential collision risk of the first potential collision risk and the second potential collision risk; and
controlling the vehicle to traverse the intersection following the selected trajectory.

13. The non-transitory computer-readable storage medium of claim 12, wherein selecting the trajectory comprises:
determining that the occupant is in a driver's seat of the vehicle; and
determining that a right turn at the intersection is to be performed; and
selecting a path for the right turn through the intersection that enhances safety of the occupant in the driver's seat.

14. The non-transitory computer-readable storage medium of claim 13, wherein selecting the path that enhances safety of the occupant in the driver's seat comprises:
determining that a right turn at the intersection enhances safety of the occupant, wherein the first trajectory for the right turn comprises a sharp turn path for the right turn and the second trajectory comprises a wide turn path for the right turn, and wherein selecting the trajectory comprises determining whether to make the sharp turn path or the wide turn path to enhance safety of the occupant.

15. The non-transitory computer-readable storage medium of claim 12, wherein controlling the vehicle to traverse the intersection following the selected trajectory moves a location of a potential collision farther from the location of the occupant within the passenger compartment.

16. A vehicle operating in an autonomous mode of operation, the vehicle comprising:
a passenger compartment;
a processor; and
a non-transitory computer-readable storage medium, storing instructions thereon that, when executed by the processor, cause the processor to perform operations comprising:
determining, a location of an occupant within a passenger compartment of the vehicle;
identifying a plurality of possible trajectories for the vehicle to traverse an intersection, wherein the possible trajectories comprise at least a first trajectory and a second trajectory;
determining, based on the first trajectory and the location of the occupant within the passenger compartment, a first potential collision risk that: (a) corresponds to potential collision between the vehicle and an object while traversing the intersection using the first trajectory, and (b) indicates a risk of harm to the occupant in the passenger compartment that is associated with the potential collision;
determining, based on the second trajectory and the location of the occupant within the passenger compartment, a second potential collision risk that: (a) corresponds to respective potential collision between the vehicle and the object while traversing the intersection using the second trajectory, and (b) indicates a risk of harm to the occupant in the passenger compartment that is associated with the respective potential collision;
selecting a trajectory from the first trajectory and the second trajectory based on identifying a lower potential collision risk of the first potential collision risk and the second potential collision risk; and
controlling the vehicle traverse the intersection following the selected trajectory.

17. The vehicle of claim 16, wherein the first trajectory and the second trajectory specify different directions of travel.

18. The vehicle of claim 17, wherein the different directions of travel comprise a sharp turn or a wide turn through the intersection.

19. The vehicle of claim 16, wherein the first trajectory and the second trajectory specify different speeds of travel through the intersection.

20. The vehicle of claim 19, wherein selecting the trajectory comprises:
determining that the occupant is in a driver's seat of the vehicle;
determining that a right turn at the intersection is to be performed; and
selecting a path for the right turn through the intersection that enhances safety of the occupant in the driver's seat.

* * * * *